United States Patent
Jelic

(10) Patent No.: US 7,137,429 B2
(45) Date of Patent: Nov. 21, 2006

(54) MODULAR FRAMED COVERING FOR ARCHITECTURAL OPENINGS

(75) Inventor: Ralph G. Jelic, Boulder, CO (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 41 days.

(21) Appl. No.: 10/607,371

(22) Filed: Jun. 25, 2003

(65) Prior Publication Data
US 2004/0040673 A1    Mar. 4, 2004

Related U.S. Application Data

(60) Provisional application No. 60/392,502, filed on Jun. 27, 2002.

(51) Int. Cl.
*E06B 9/08* (2006.01)
(52) U.S. Cl. .............. 160/120; 160/239; 160/321; 403/331; 403/381
(58) Field of Classification Search .......... 160/98, 160/120, 121.1, 122, 31, 239, 240, 323.1, 160/326, 321; 403/331, 381; 248/268
See application file for complete search history.

(56) References Cited

U.S. PATENT DOCUMENTS

| | | | | |
|---|---|---|---|---|
| 179,123 A | * | 6/1876 | McGill | 160/120 |
| 1,948,262 A | * | 2/1934 | Gabriel | 160/31 |
| 2,870,831 A | * | 1/1959 | Peselnick | 160/120 |
| 4,444,242 A | | 4/1984 | Amsler et al. | 160/172 |
| 5,016,701 A | * | 5/1991 | Vore | 160/241 |
| 5,052,459 A | * | 10/1991 | Grossenbacher | 160/122 |
| 5,568,831 A | * | 10/1996 | Blackwell | 160/98 |
| 6,223,803 B1 | * | 5/2001 | Nielsen | 160/98 |
| 6,328,090 B1 | | 12/2001 | Anderson et al. | 160/84.05 |
| 6,354,354 B1 | * | 3/2002 | Schmidt | 160/98 |
| 6,571,851 B1 | * | 6/2003 | Jelic et al. | 160/84.06 |
| 2002/0100562 A1 | * | 8/2002 | Ikle | 160/120 |
| 2003/0136053 A1 | | 7/2003 | Norbert | 49/74.1 |

\* cited by examiner

*Primary Examiner*—Blair M. Johnson
(74) *Attorney, Agent, or Firm*—Dorsey & Whitney LLP

(57) ABSTRACT

A modular covering for architectural openings includes a peripheral frame that supports a plurality of rotatable elements that might support strips or sheets of flexible material or rigid slats. The peripheral frame includes a drive system for rotating the members about their longitudinal axis and the members are mounted in the peripheral frame and joined to the drive system in a releasable manner so that they can be replaced. The covering elements supported by the rotatable members can therefore be easily replaced in the covering by replacing the pivotal member itself so as to allow for varied aesthetics and functionality.

17 Claims, 29 Drawing Sheets

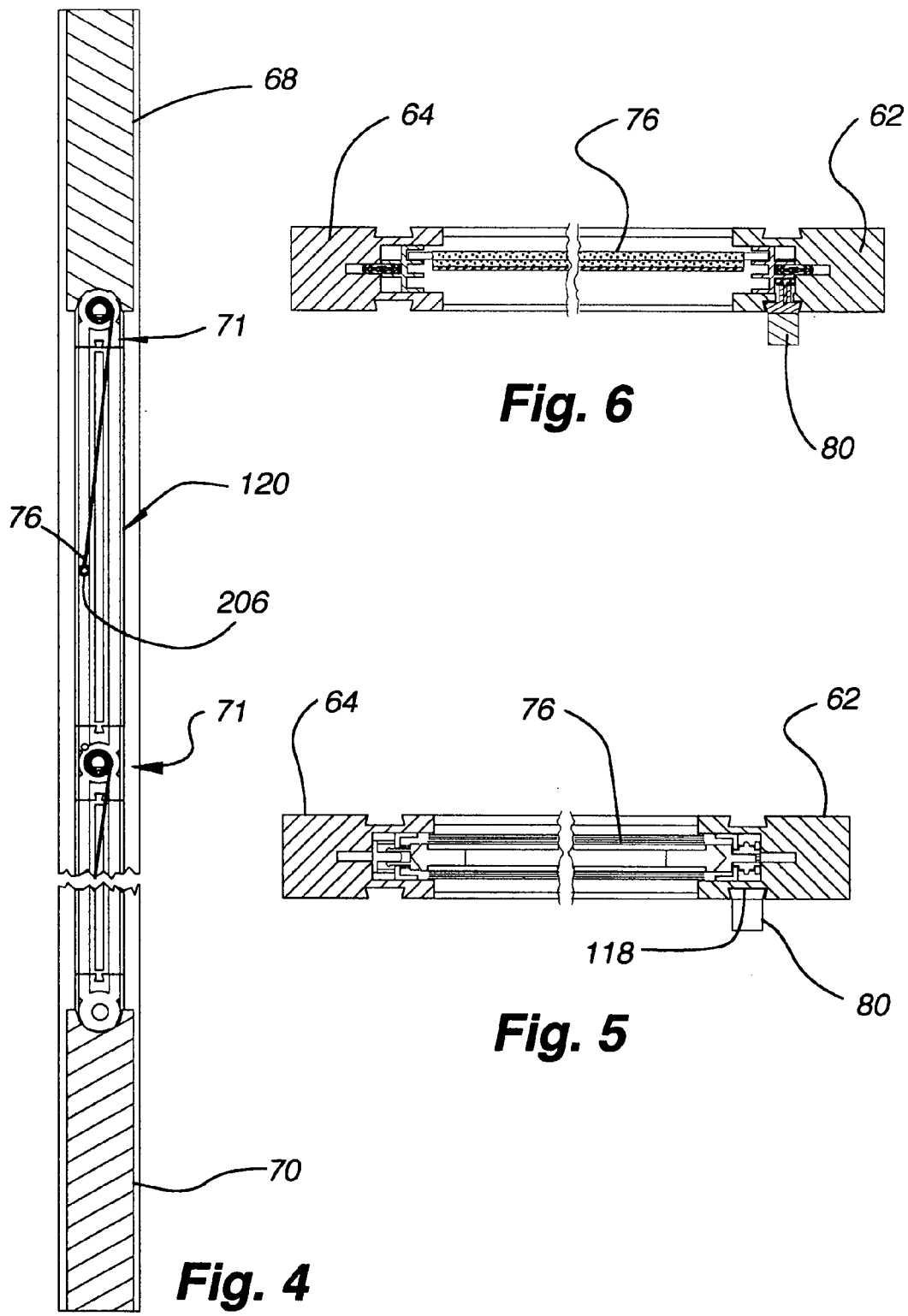

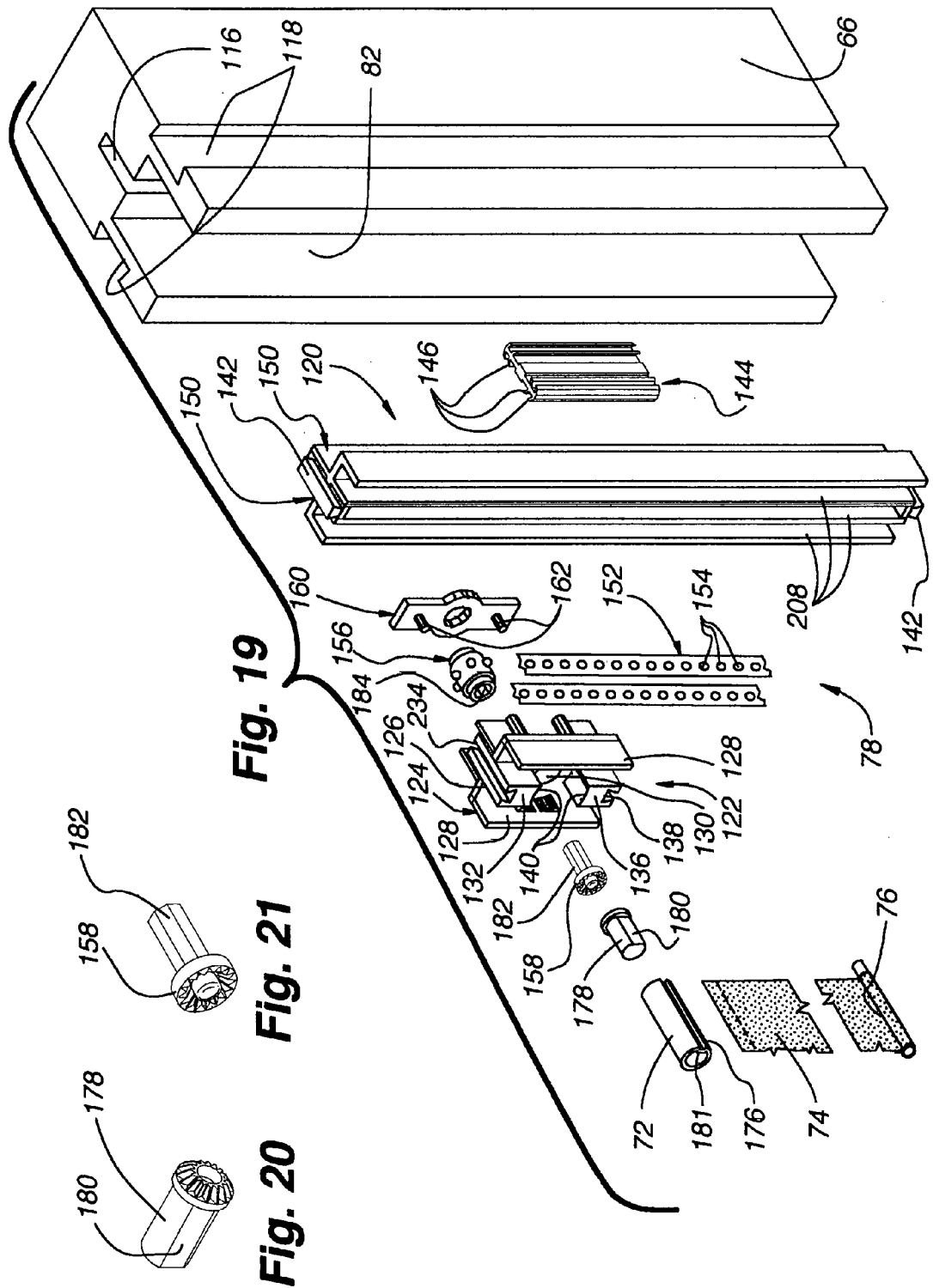

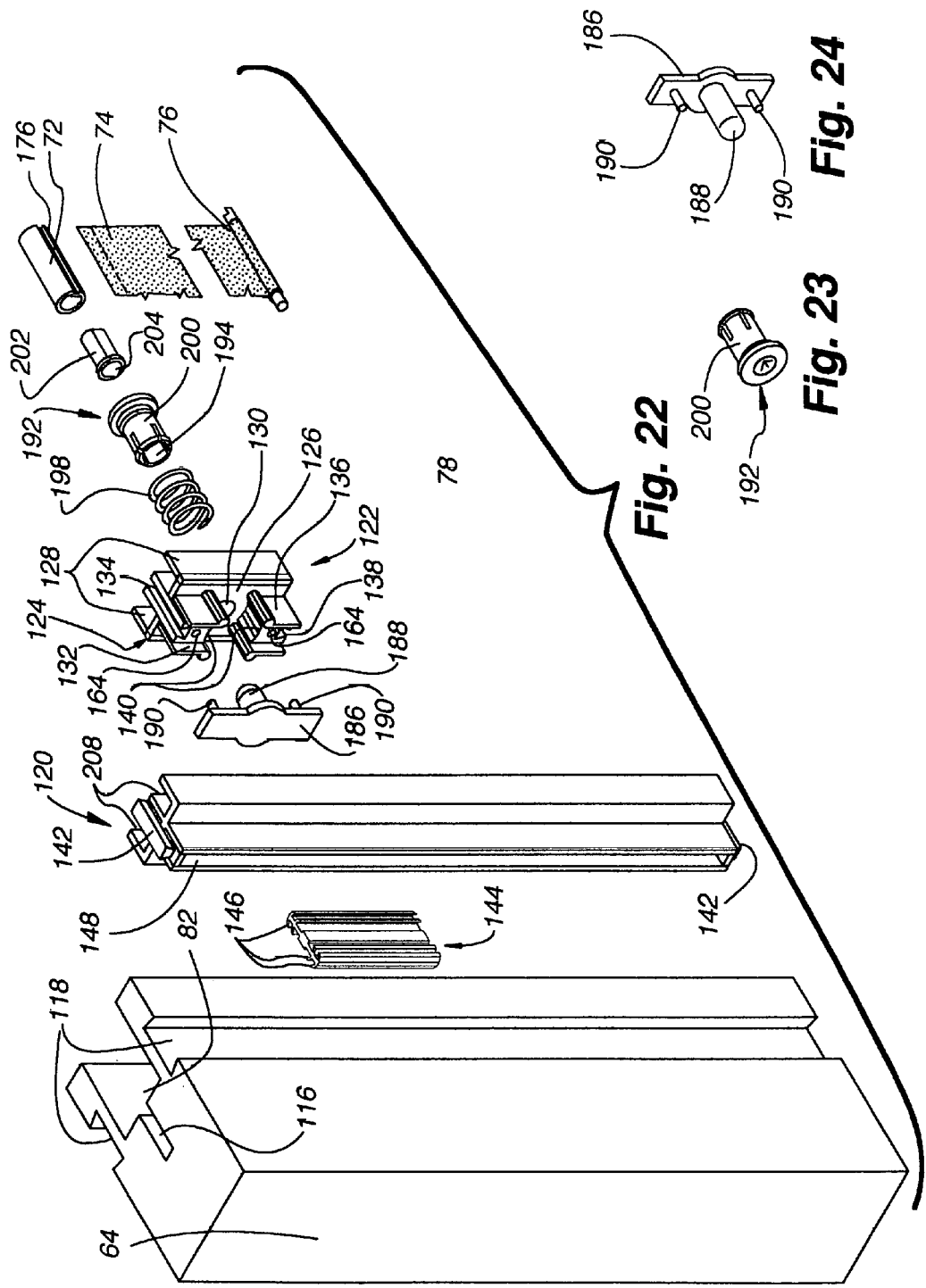

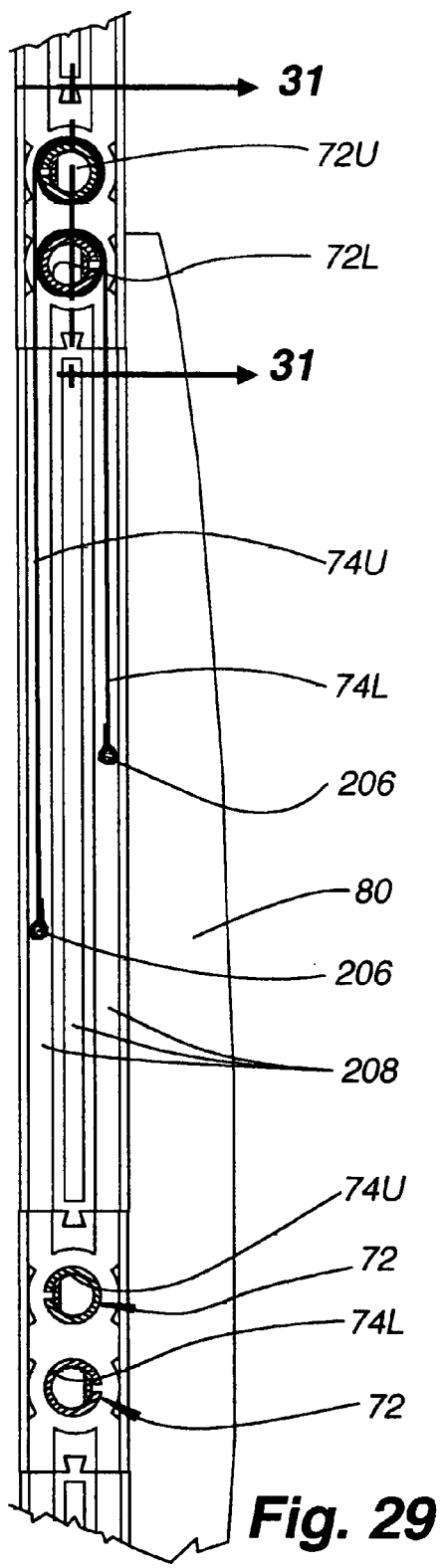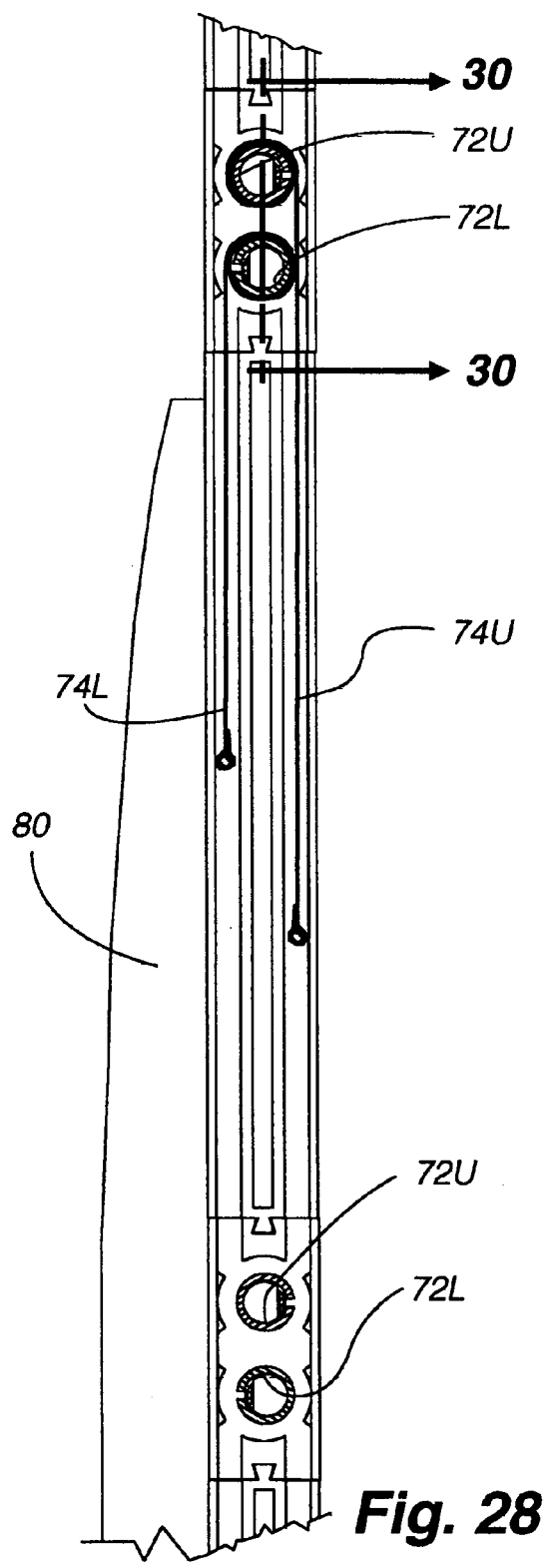
Fig. 29
Fig. 28

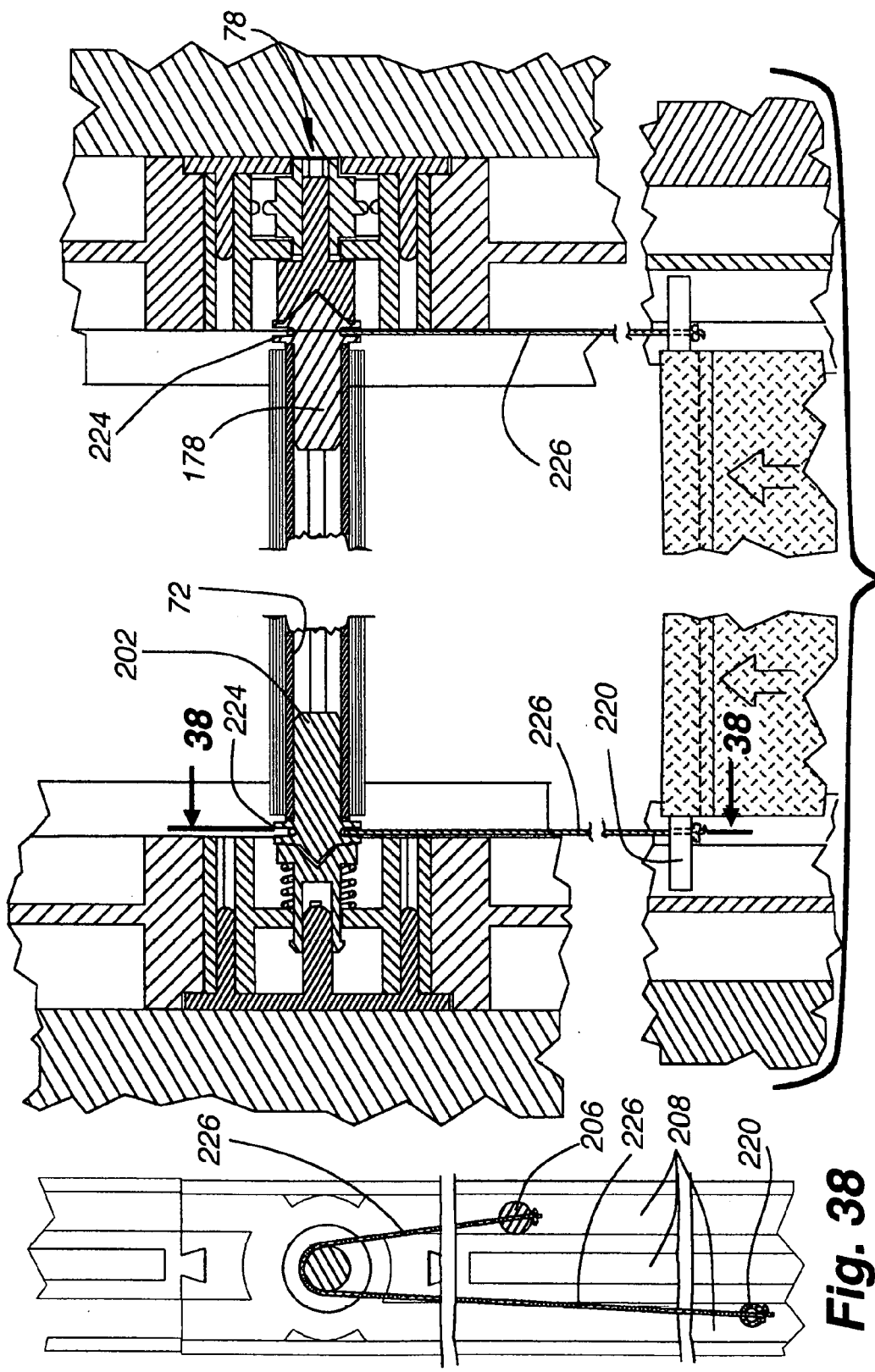

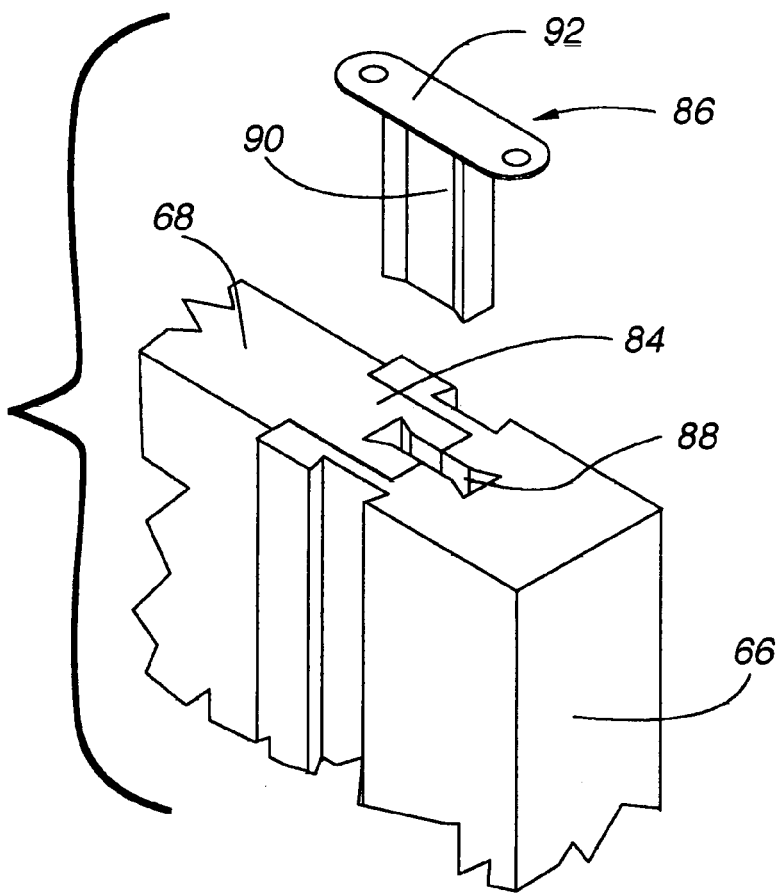
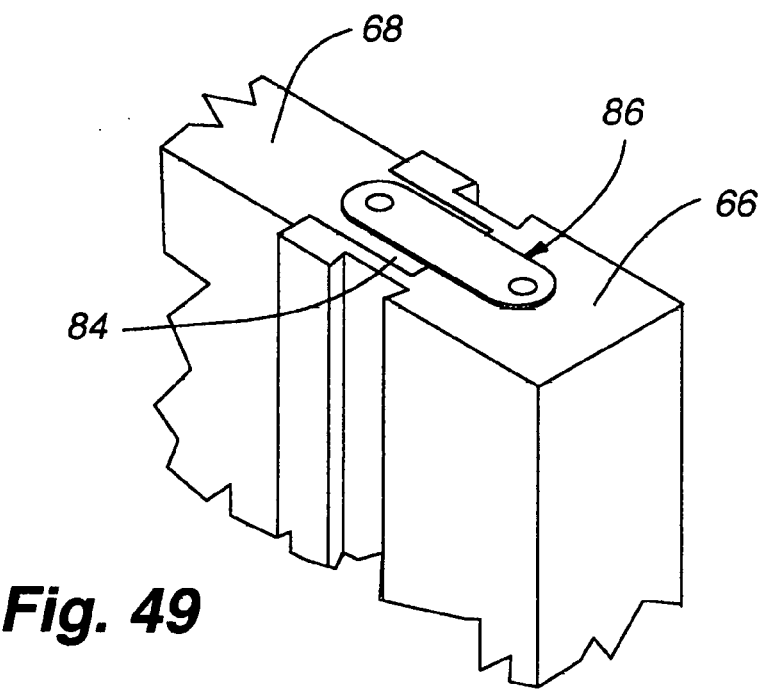

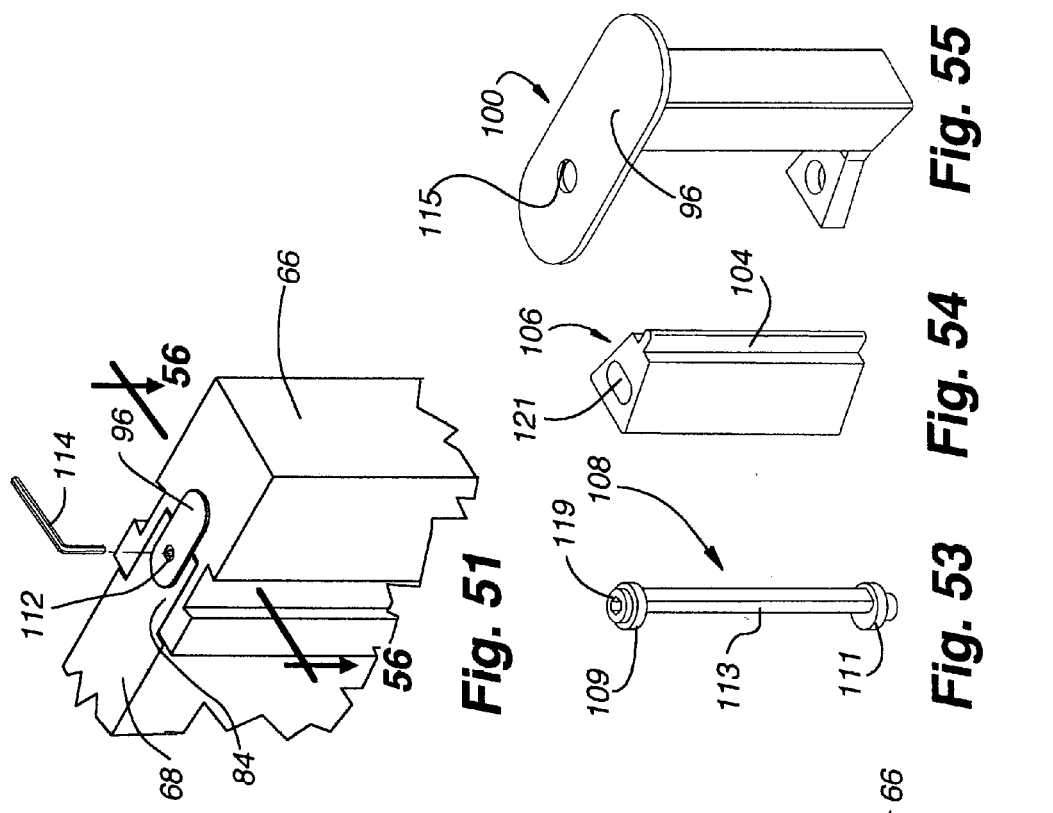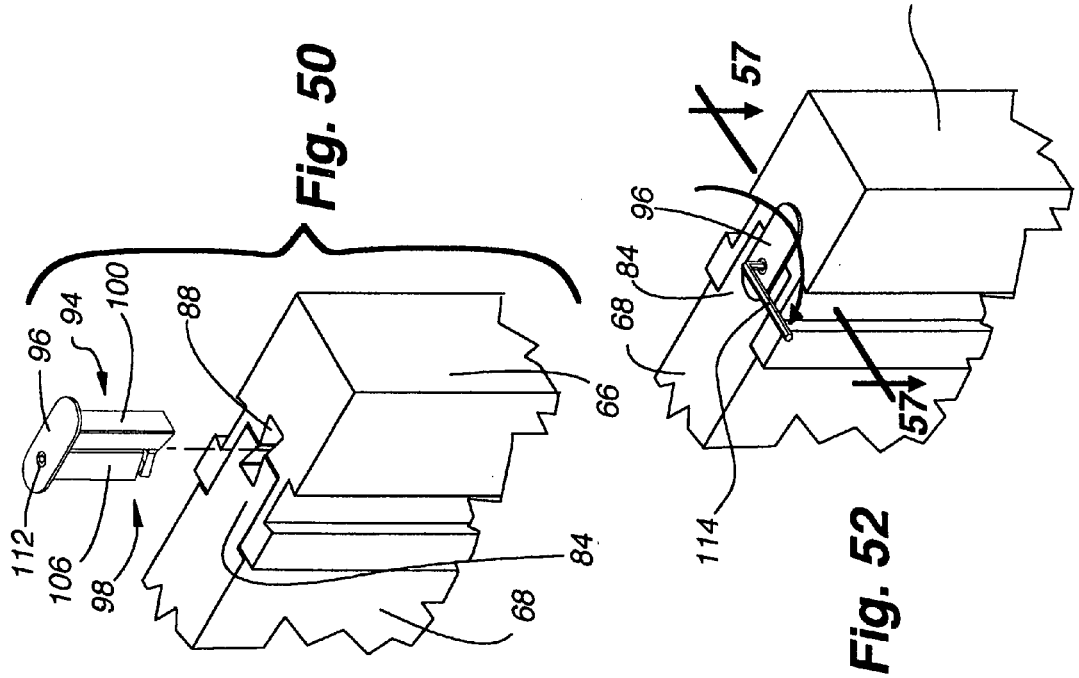

MODULAR FRAMED COVERING FOR ARCHITECTURAL OPENINGS

CROSS-REFERENCE TO RELATED APPLICATION

This application claims the benefit of and priority to U.S. provisional application No. 60/392,502, filed Jun. 27, 2002, which application is hereby incorporated herewith as if fully disclosed herein.

BACKGROUND OF THE INVENTION

1. Field of the Invention

The present invention relates generally to coverings for architectural openings such as windows, doors, archways and the like and more particularly to a covering including a peripheral frame disposed around at least a portion of the opening with a plurality of rotatable members extending from opposite sides of the peripheral frame and supporting a covering element that is movable between open and closed positions to block or permit the passage of light, vision and the like through the opening. The rotatable members are removably mounted so that the covering elements can be interchanged. A drive system is provided in the peripheral frame for engagement with the rotatable members to selectively rotate the members. The drive system itself is modular so as to fit various sized peripheral frames.

2. Description of the Relevant Art

Coverings for architectural openings such as windows, doors, archways and the like have taken many numerous forms for many years. Originally such coverings consisted simply of fabric draped across the opening but through evolution, draperies and curtains developed which could be selectively moved between open and closed positions through use of a control system and a head rail extending across the top of the architectural opening.

Venetian blinds are another common form of covering for architectural openings wherein a plurality of horizontal slats are supported on cord ladders so that the slats can be pivoted in unison between open and closed positions. The slats can also be retracted by lift cords into a vertical stack adjacent to the top of the opening or lowered into an extended position where the slats are uniformly dispersed vertically across the architectural opening.

Coverings similar to venetian blinds are referred to as shutter systems wherein a plurality of wood slats are horizontally disposed and pivotally mounted in a framework and include an operating bar to pivot the slats of the shutter in unison between open and closed positions. Shutters, while providing a different aesthetic look, have the disadvantage that the slats provided therein cannot be retracted or extended across the opening.

Vertical blinds have also been developed wherein the slats extend vertically rather than horizontally as in a Venetian blind. Such vertical blind coverings operate in a similar matter except that in a vertical blind, the slats are retractable into a horizontal stack adjacent one side of the opening rather than a vertical stack adjacent to the top of the opening as with a conventional venetian blind.

More recently, collapsible cellular shades have also been developed wherein a plurality of collapsible cells are interconnected and adapted to be extended across an architectural opening or retracted adjacent to the top or bottom of the opening into a neat stack. Other cellular shades have been developed wherein a pair of sheets of material are vertically suspended in parallel spaced relationship and include a plurality of vertically spaced flexible vanes interconnecting the sheets whereby vertical movement of the sheets in opposite directions cause the vanes to move between open and closed positions for blocking or permitting the passage of light or vision through the covering.

As will be appreciated from the above, coverings for architectural openings have taken numerous forms and vary so as to provide different aesthetics as well as functional characteristics and it is in furtherance of those variables that the present invention has been developed.

SUMMARY OF THE INVENTION

The present invention relates generally to a covering for an architectural opening wherein a plurality of covering elements are mounted on rotatable rods which extend between opposite sides of a peripheral frame adapted to extend around at least a portion of the architectural opening. The rods are releasably mounted in the frame so as to be interchangeable whereby the aesthetics and functionality of the covering can be easily changed.

The rods are rotatably moved by a drive system mounted in the peripheral frame with the drive system being operably connected with at least one end of a rod so that when the drive system is operated, the rod is caused to rotate about its longitudinal axis. The drive system is operated by a slide member mounted on the peripheral frame and the components in the drive system are modular so that the drive system can be fabricated on-site to fit any sized peripheral frame.

The covering elements can be flexible sheets of material such as fabric material that is woven, non-woven, knitted or the like whereby the flexible material can be rolled around the rod or unrolled from the rod depending upon the direction of rotatable movement of the rod. The flexible material can be made to move downwardly from its associated rod or upwardly from the rod and when there are a plurality of such rods mounted in spaced relationship, the flexible material is adapted to extend between adjacent rods when the covering is in a closed or extended position. Pairs of rods may also be mounted in adjacent relationship each carrying a flexible fabric material which can be rolled onto the rod or unrolled from the rod by its own independent drive system.

The covering elements might also be rigid such as a wood slat of the type found in a shutter type covering for architectural openings. In fact, when wooden slats are used as the covering elements, the covering resembles a shutter system except that the slats of the shutters are pivoted about their longitudinal axis by the modular drive system incorporated into the other embodiments of the present invention and therefore are not operated with a control bar of the type found in typical shutter systems where the control bar is simply connected to each slat of the shutter at a centered location along the length of the slat and by a lose connection thereto.

Other aspects, features and details of the present invention can be more completely understood by reference to the following detailed description of a preferred embodiment, taken in conjunction with the drawings and from the appended claims.

BRIEF DESCRIPTION OF THE DRAWINGS

FIG. 4 is a section taken along line 4—4 of FIG. 3.

FIG. 5 is a fragmentary section taken along line 5—5 of FIG. 3.

FIG. 6 is a fragmentary section taken along line 6—6 of FIG. 3.

FIG. 19 is an exploded isometric view of the components of the covering of the present invention along the right side of the peripheral frame.

FIG. 20 is an isometric of the bevel gear used in a covering element of the present invention.

FIG. 21 is an isometric of a miter gear of the drive system used in the covering of the present invention.

FIG. 22 is an exploded isometric of the components of the covering of the present invention in a left side frame member.

FIG. 23 is an isometric of an idler cylinder used at the idler end of a covering element.

FIG. 24 is an isometric of an idler plate used to support the idler end of a covering element.

FIG. 28 is an enlarged fragmentary section taken along line 28—28 of FIG. 27.

FIG. 29 is an enlarged fragmentary section taken along line 29—29 of FIG. 27.

FIG. 37 is an enlarged fragmentary section taken along line 37—37 of FIG. 34.

FIG. 38 is a fragmentary section taken along line 38—38 of FIG. 37.

FIG. 48 is an exploded fragmentary isometric showing a connection of vertical and horizontal frame components of the peripheral frame of the present invention.

FIG. 49 is an isometric similar to FIG. 48 with the frame components having been connected.

FIG. 50 is an exploded isometric showing an alternative adjustable dove-tail connector for connecting vertical and peripheral frame members of the covering of the present invention.

FIG. 51 is an isometric similar to FIG. 50 with the components having been connected with the adjustable dove-tail connector and showing an allen wrench exploded therefrom.

FIG. 52 is a view similar to FIG. 51 with an allen wrench being shown adjusting the dove-tail connector.

FIG. 53 is an isometric of an eccentric drive shaft for the connector of FIG. 50.

FIG. 54 is an isometric of the movable side of the connector of FIG. 50.

FIG. 55 is an isometric of the fixed side of the connector of FIG. 50.

DESCRIPTION OF THE PREFERRED EMBODIMENTS

Figure 1:
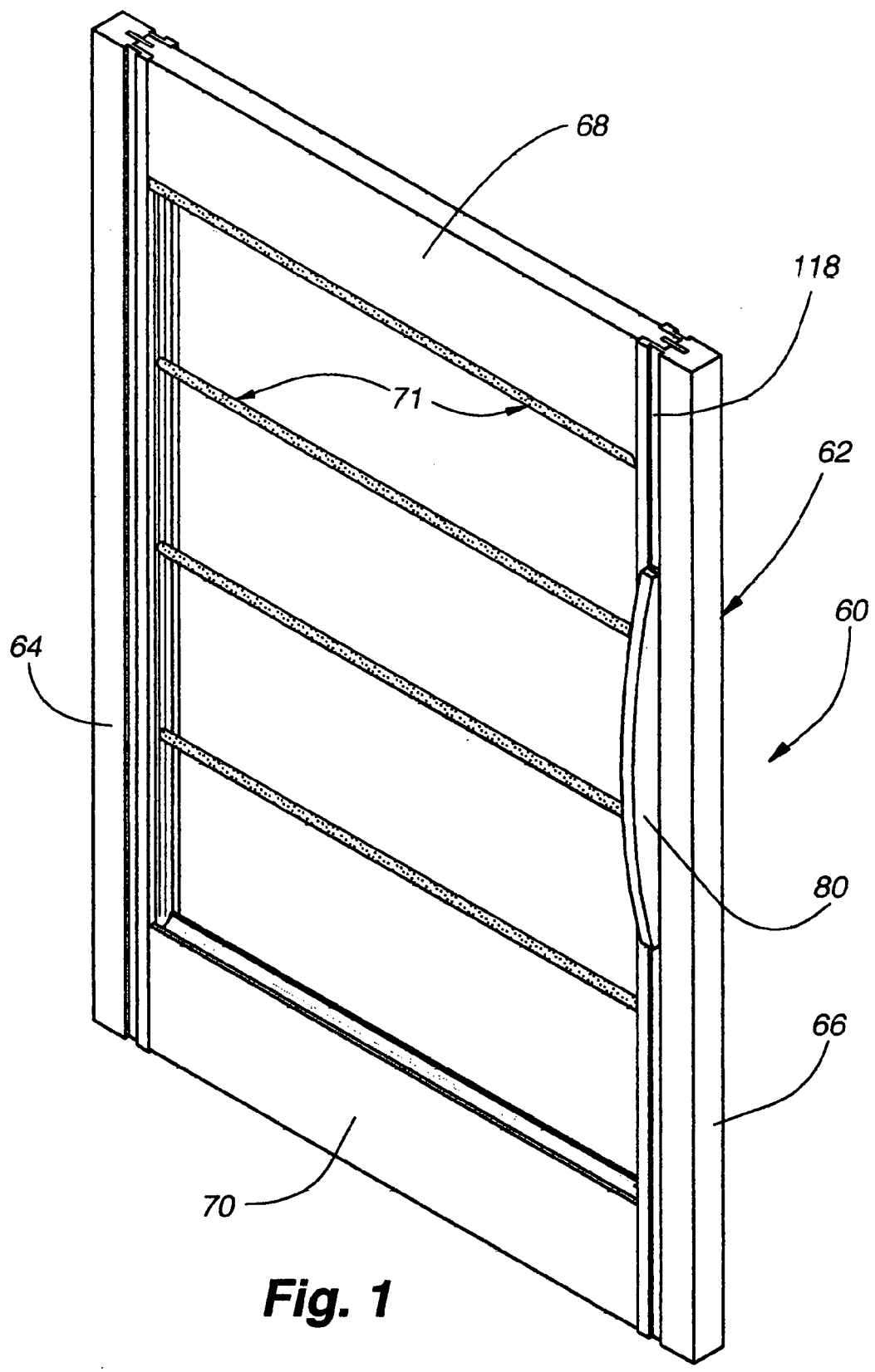
FIG. 1 is an isometric view of a first embodiment of the covering of the present invention where a flexible material is used as a covering element, and the covering is shown in a retracted position.
Figure 2:
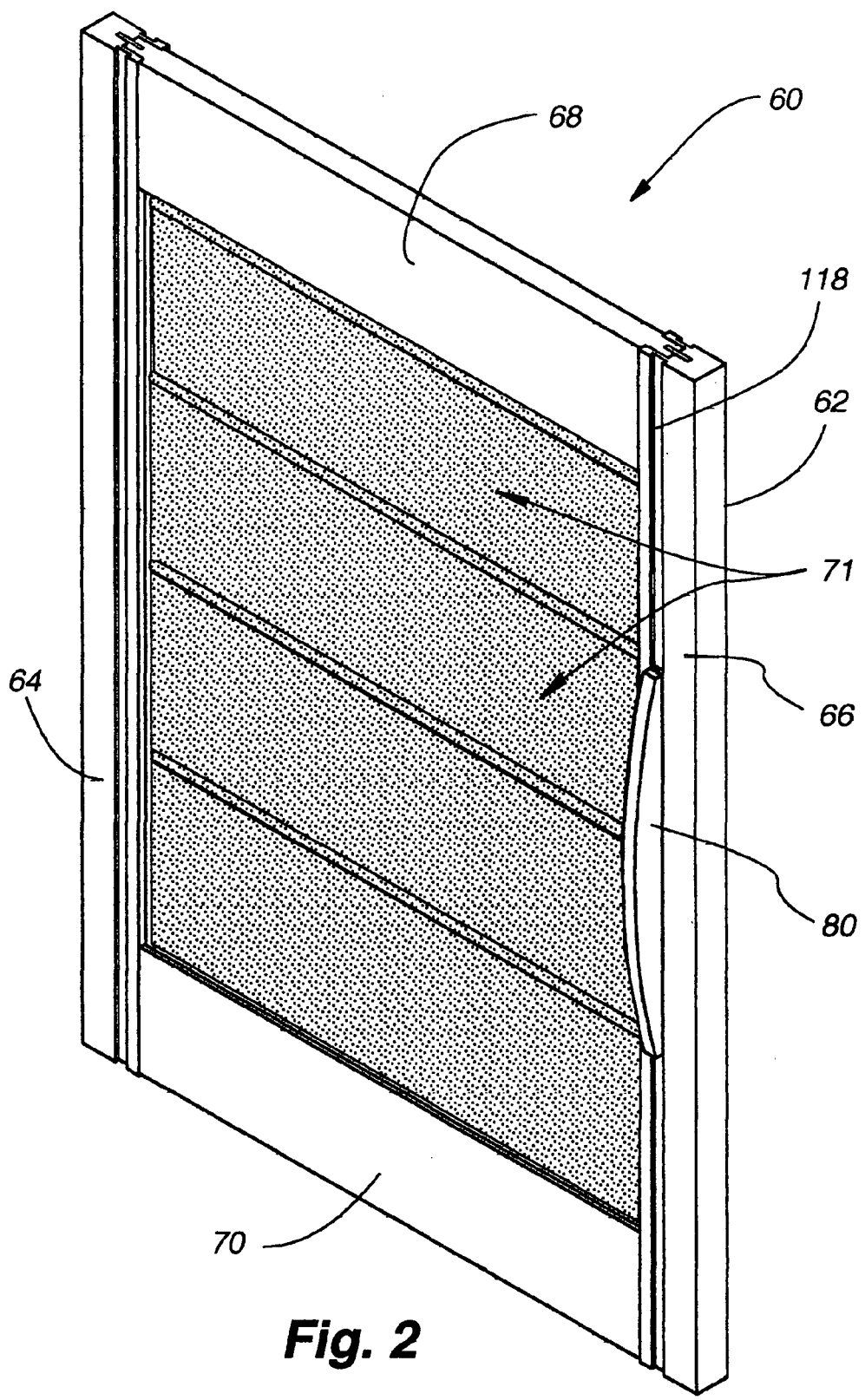
FIG. 2 is an isometric view similar to FIG. 1 with the covering shown in an extended position.

A first embodiment of the present invention is illustrated in FIGS. 1 through 25 and with reference to FIGS. 1 and 2, it will be seen that the covering 60 includes a peripheral frame 62 having left and right side frame members 64 and 66 respectively, a top frame member 68 and a bottom frame member 70. The top and bottom frame members are secured to the respective ends of the side frame members in a manner to be described later. The peripheral frame surrounds an enclosed area wherein a plurality of covering elements 71 including horizontal rollers or bars 72 having a flexible material 74 thereon are mounted in vertically spaced relationship so as to extend between the left and right side frame members. It will be appreciated with the following description of the invention, however, that while the rollers 72 are mounted in a horizontal orientation, they could also be vertically mounted with relatively minor changes made to the invention which would be readily apparent to those skilled in the art.

The flexible fabric material 74 is mounted along an edge Thereof to an associated roller 72 in any suitable manner such as with an adhesive, a tongue-in-groove connection or the like, so that rotation of the roller in a first direction causes the flexible material to wrap around the roller while rotational movement of the roller in the opposite direction causes it to unwrap from the roller. In the embodiment illustrated in FIGS. 1 through 25, when the flexible material is unwrapped from the roller, its free edge 76 drops downwardly so the material bridges the space between the roller to which it is attached and the next adjacent lower roller. FIG. 1 shows the covering 60 with the flexible materials fully wrapped around their associated rollers so that the covering is in a retracted position and in FIG. 2, the flexible materials are unrolled from the associated rollers bridging the space between the roller to which they are attached and the next adjacent lower roller so that the covering is in a fully extended position. As will be appreciated, in the fully extended position, the flexible materials in aggregate completely cover the space defined by the peripheral frame 62. If the flexible material were an opaque material, for example, there would be a substantially total blockage of light through the opening defined by the peripheral frame. The flexible materials would not have to be opaque, but rather could be any woven, non-woven, knit, shear fabric or the like so as to provide the desired aesthetics and control of vision and light through the opening.

A control or drive system 78 to be described in more detail later is mounted within the right side frame member 66 and includes a vertical finger slide 80 which moves the covering between the retracted and extended positions by vertical linear movement up or down as the case may be. The side frame members 64 and 66 as seen in FIGS. 19 and 22 are channel frame members which have a main body portion and a generally U-shaped channel 82 formed along a vertical inner side thereof.

The top 68 and bottom 70 frame members are solid bars having a reduced dimension extension 84 from their opposite ends with the extension being dimensioned frictionally fit within the channel 82 at the top or bottom of a side frame member as the case may be. The top and bottom frame members are secured to the side frame members with a dove-tail fastener 86 seen in FIGS. 48 and 49 with the fasteners being adapted to be inserted into a mating recess 88 provided in the top and bottom of the peripheral frame 62 at the junctures of the top and bottom frame members with the side frame members. The recesses 88 overlap a top or bottom frame member and the associated side frame member. The fastener 86 has a main body 90 with dove tail projections that is complimentary or mates with the recess and a cap 92 so that when the main body is inserted into the recess, dove-tailed connections are established to secure the top and bottom frame members to the side frame members. The cap of the fastener is flush with the top or bottom of the frame as the case may be when the fastener main body 90 is received in the recess 88.

With reference to FIGS. 50 through 59, the dove-tail fastener may also be adjustable so as to not necessarily rely upon a perfect friction fit between the main body of the fastener and the recess 88. As will be appreciated in FIGS. 50 through 59, the adjustable fastener 94 has a cap 96 similar to the cap 92 previously described, and a main body 98 of two relatively slideable components. A fixed component 100 of dove-tail cross sectional configuration is fixed to the cap 96 so as to depend downwardly therefrom and be received in a complementary portion of the recess 88. The fixed component 100 has a groove 102 formed in a lateral face thereof which is adapted to slideably receive a tongue 104 from a movable component 106 of the main body. The movable component is not as wide as the fixed component but it too is dove-tailed in configuration and designed to fit within the other half of the recess 88. A rotatable eccentric drive member 108 having circular upper 109 and lower 111 discs and an offset eccentric drive shaft 113 there between is pivotally supported by the lower disc 111 on a lateral extension 110 from the bottom of the fixed component 100 of the main body and is pivotally guided by the upper disc 109 in a circular opening 115 through the cap 96. The drive member is pivoted about the central axes of the discs 109 and 111 by an allen wrench 114 releasably receivable in a hexagonal blind hole 112 in the top of the upper disc 109. It will be appreciated that pivotal movement of the drive member 108 causes the drive shaft 113 to move in an arc from an extreme left position of FIGS. 56 and 58 to an extreme right position of FIGS. 57 and 59. The drive shaft extends through an ovular opening 121 through the movable component so that as the drive shaft is moved along its arc, it forces the movable component toward or away from the fixed component. The ovular shape of the opening 121 allows for the arcuate movement of the drive shaft as it forces movement of the movable component. It will therefore be appreciated, particularly by reference to FIGS. 56 through 59, that by moving the movable component toward the fixed component, the adjustable fastener 94 can be tightened thereby pulling the associated frame members of the peripheral frame into a tight abutting relationship.

Figure 3:
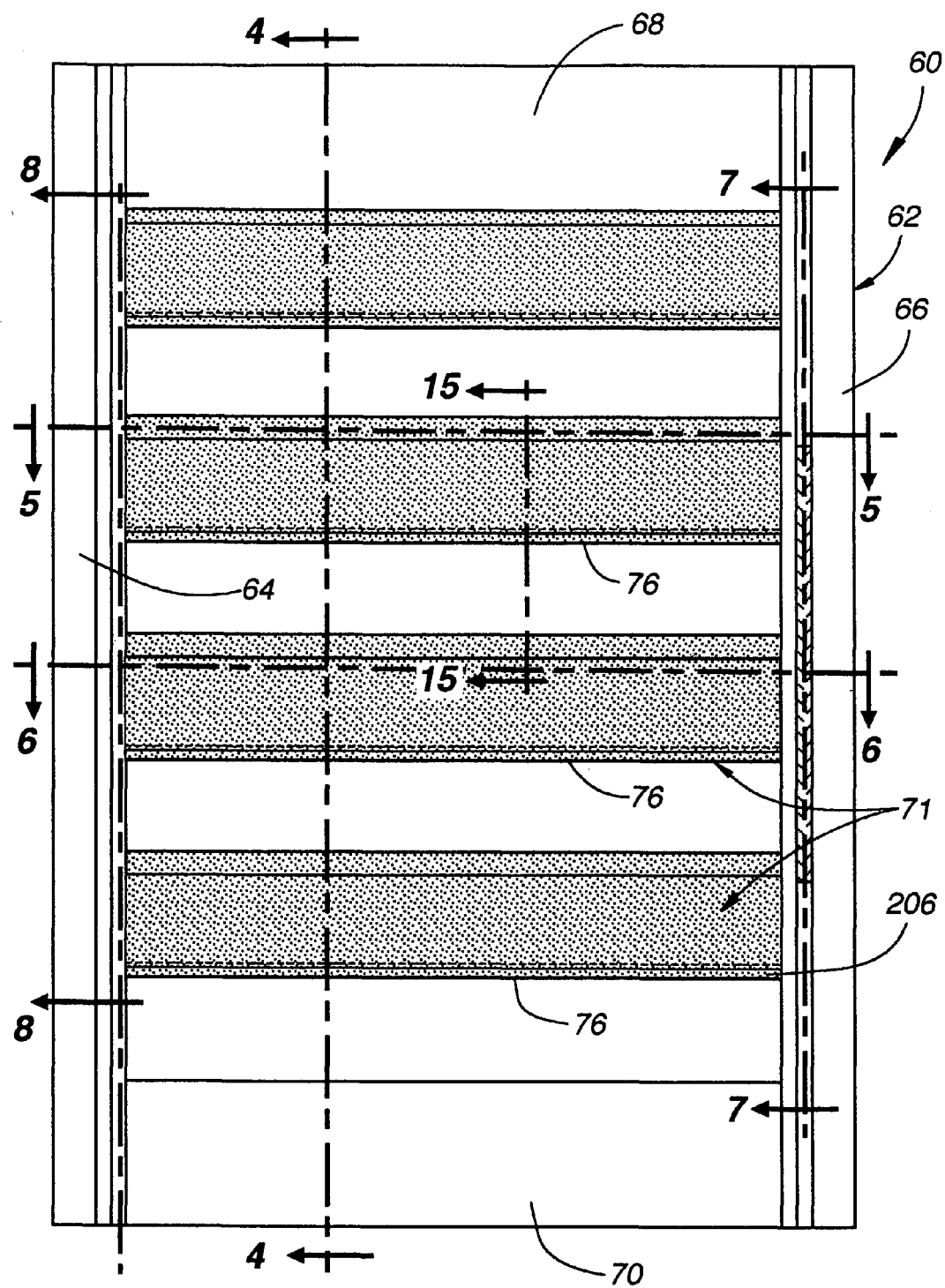
FIG. 3 is an enlarged front elevation of the covering shown in FIGS. 1 and 2 with the covering elements in a partially extended position.

FIG. 3 is a front elevation showing the covering elements 71 partially extended, i.e., wherein the flexible materials 74 have been partially unrolled from their associated rollers 72. This of course, illustrates another operative position of the covering of the present invention which is between the fully retracted and fully extended positions of FIGS. 1 and 2 respectively.

The drive system 78 for moving the covering elements 71 between extended and retracted positions is mounted in the right side frame member 66 as mentioned previously and is probably best illustrated in FIGS. 7 through 25. With particular reference to FIGS. 19 and 22, it will be seen that the side frame members, in addition to the vertical channels 82 formed therein, have a reduced width vertical channel 116 forming an extension from the channel 82 in the main body of the associated side frame member. In addition, a pair of outwardly opening vertical channels 118 are formed in the front and rear faces of the side frame members 64 and 66 at a location that is approximately in lateral alignment with the innermost surface of the main channel 82. The main channel is designed to receive and confine therein a plurality of identical vertical guide pieces or members 120 which are interconnected by modular connectors 122 with there being a modular connector associated with each roller 72. Accordingly, the modular connectors are spaced along the height of the associated side frame members at equally spaced locations corresponding to the gap desired between adjacent rollers. The length of each vertical guide member is also cut to correspond to the spacing between adjacent rollers so that a modular system is provided which will accommodate any desired number of rollers into any predetermined height peripheral frame.

The modular connector 122 as seen in FIGS. 19 and 22 has a main body 124 of generally U-shaped configuration with a base 126 and two plate like legs 128 that extend toward an opposite side frame member. At the center of the base a circular aperture 130 is provided to receive drive components of the drive system and above and below that aperture, are block members with the upper block member 132 having a dove-tail slot 134 opening upwardly and the bottom block member 136 having a dove-tail slot 138 opening downwardly. The inwardly directed faces 140 of the blocks are arcuate to accommodate drive components of the drive system as will be appreciated with the description that follows.

The top and bottom of each vertical guide member 120 has a dove-tail protrusion 142 adapted to be received in an associated dove-tail slot of a modular connector 122 so that the connectors can be easily attached to the top or bottom of a guide member whereby modular connectors are positioned between vertically adjacent guides and also at the top and bottom of a side frame member.

As seen in FIGS. 19 and 22, a fastener plate 144 is utilized to secure a guide member 120 to a side frame member 64 or 66 with the fastener plate having a plurality of beveled teeth 146 along opposite vertical side edges thereof with the beveled teeth being tapered toward the opposite side edge. The fastener plate is made of a somewhat flexible material such that it can be inserted into the reduced width vertical slot 116 in the side frame member as well as into a vertical slot 148 defined in a rear face of the guide member which is seen best in FIG. 22. In other words, when the fastener plate 144 is inserted into the slots, the beveled teeth thereon grip the sides of the slots and prevent the fastener plate from being released from both the side frame member and the guide member thereby positively holding the guide member within the channel of the side frame member.

The guide member 120 has a pair of spaced channels 150 that open away from the opposite side frame member which are adapted to slidably receive vertical runs of a drive belt 152 (FIGS. 19 and 22). The drive belt is made of a flexible but non-extensible material which could be plastic by way of example. The drive belt includes a plurality of longitudinally and uniformly spaced holes 154 for a purpose to be described later. The drive belt is part of the drive system 78 which is incorporated into the right side frame member 66 as mentioned previously and the drive belt is engaged with a cog wheel 156 that is rotatably mounted within each modular connector 122.

Figures 13, 14:
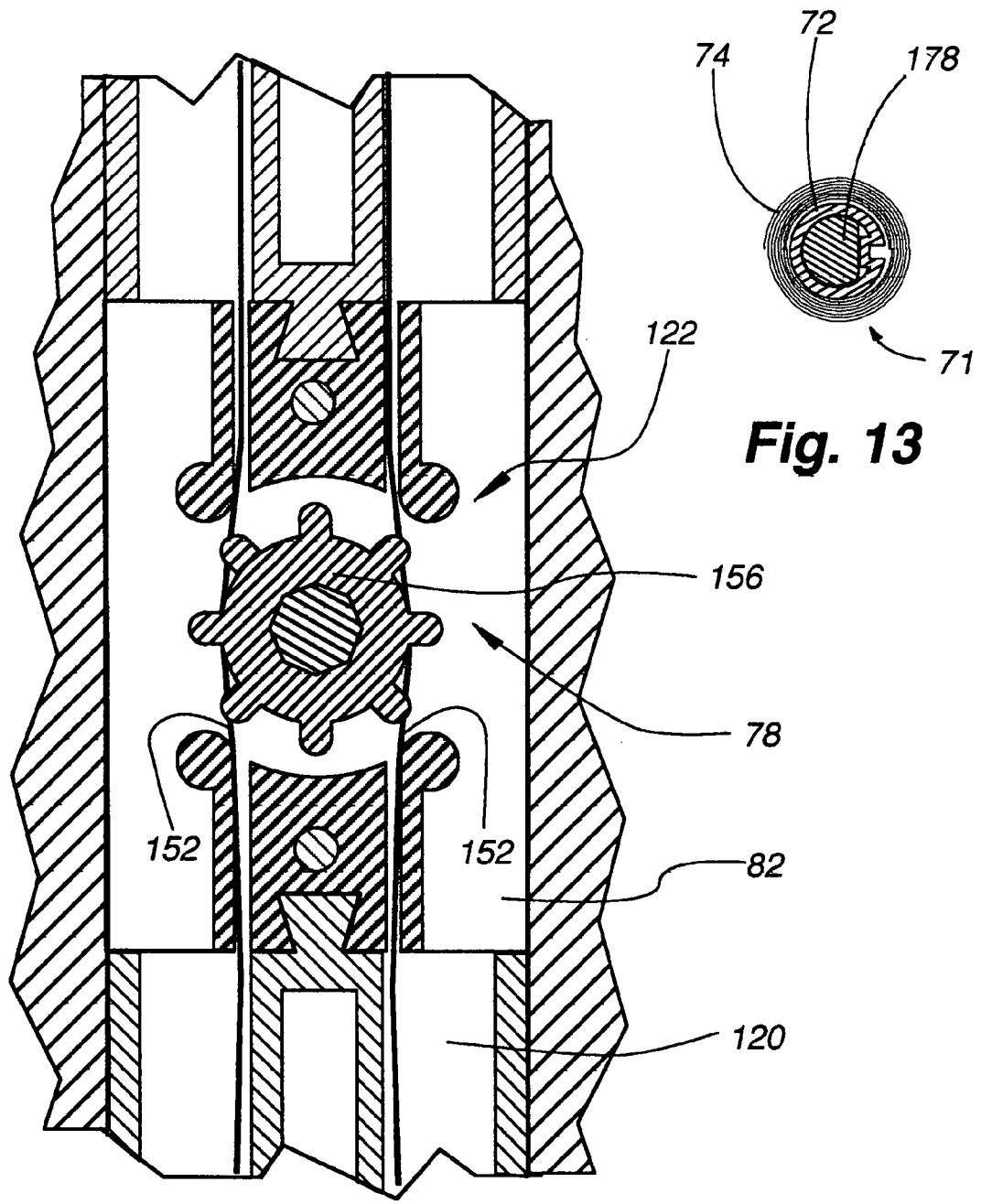
FIG. 13 is a section taken along line 13—13 of FIG. 9.
FIG. 14 is an enlarged section taken along line 14—14 of FIG. 9.

The drive system 78 as mentioned previously is only disposed in the right side frame member 66 with the left side frame member 64 having corresponding idler parts to be described hereafter. The drive components associated with each modular connector are best seen in FIG. 19 to include the drive belt 152, the cog wheel 156, a miter gear 158 that is operatively connected to the cog wheel for unitary rotation therewith and a bearing plate 160 that supports one end of the cog wheel in an opening therein. The opposite end of the cog wheel is rotatably supported in the circular aperture 130 in the base of the modular connector. As is best seen in FIGS. 19 and 22, the bearing plate 160 has a pair of alignment pins 162 that are adapted to be received in apertures 164 in the upper and lower blocks of the modular connector. As probably best appreciated by reference to FIGS. 7 and 9, the cog wheel is thereby rotatably mounted in the modular connector and in alignment with the channels 150 of the guide member in which the vertical runs of the drive belt extend. In this manner, the cogs on the cog wheel are engageable with the holes 154 in the drive belt such that movement of the drive belt causes the cog wheel to rotate correspondingly. FIG. 14 illustrates the operative engagement between the drive belt and the cog wheel in more detail.

Figure 7:
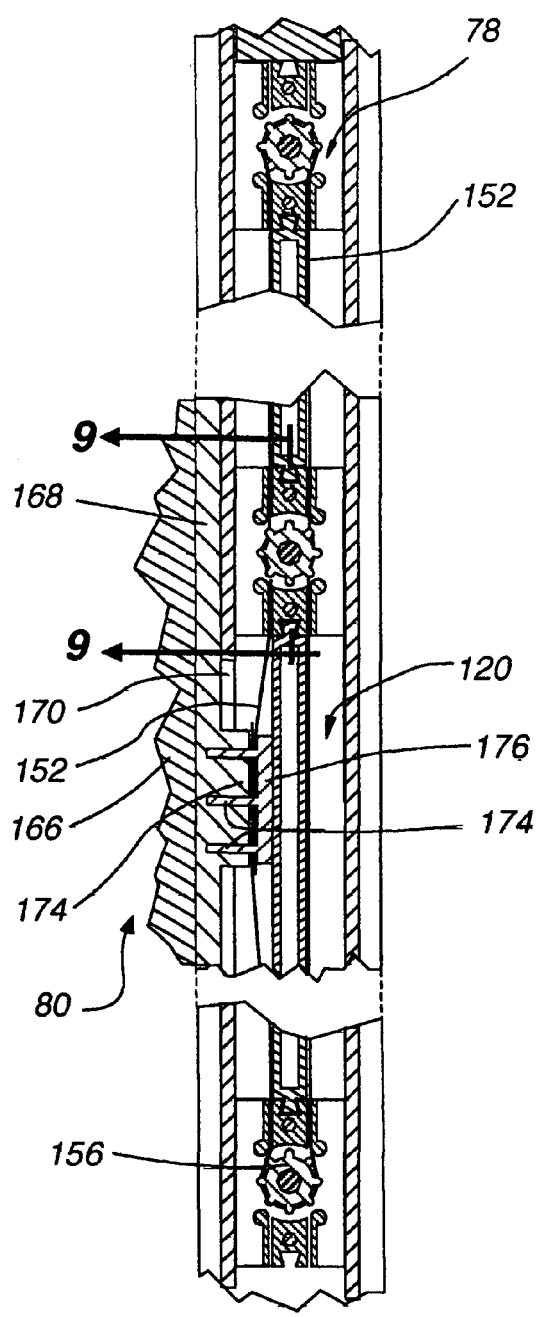
FIG. 7 is an enlarged fragmentary section taken along line 7—7 of FIG. 3.
Figure 8:
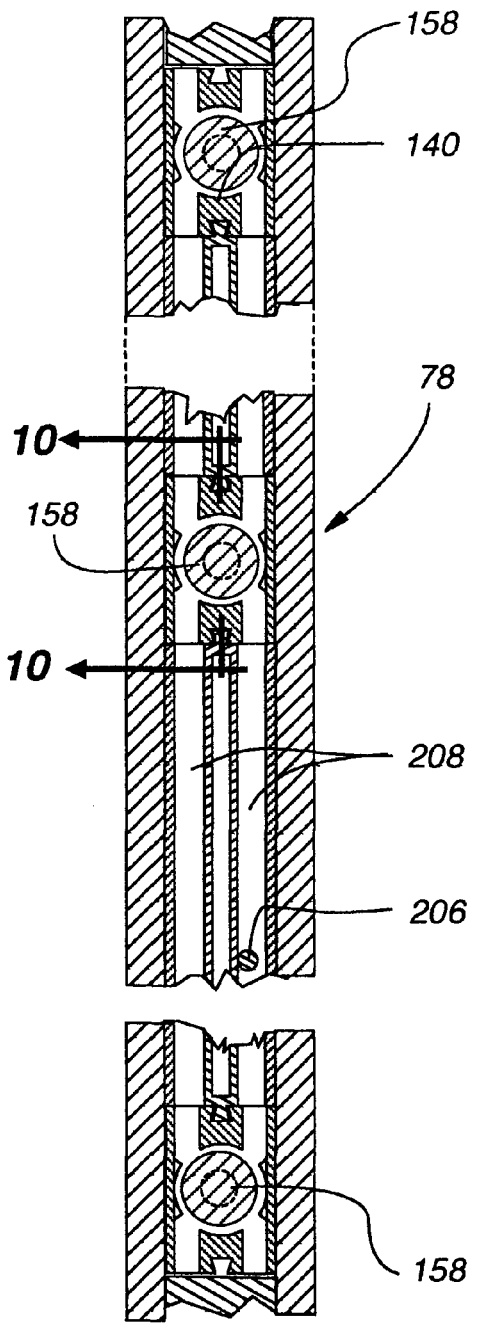
FIG. 8 is an enlarged fragmentary section taken along line 8—8 of FIG. 3.
Figure 9:
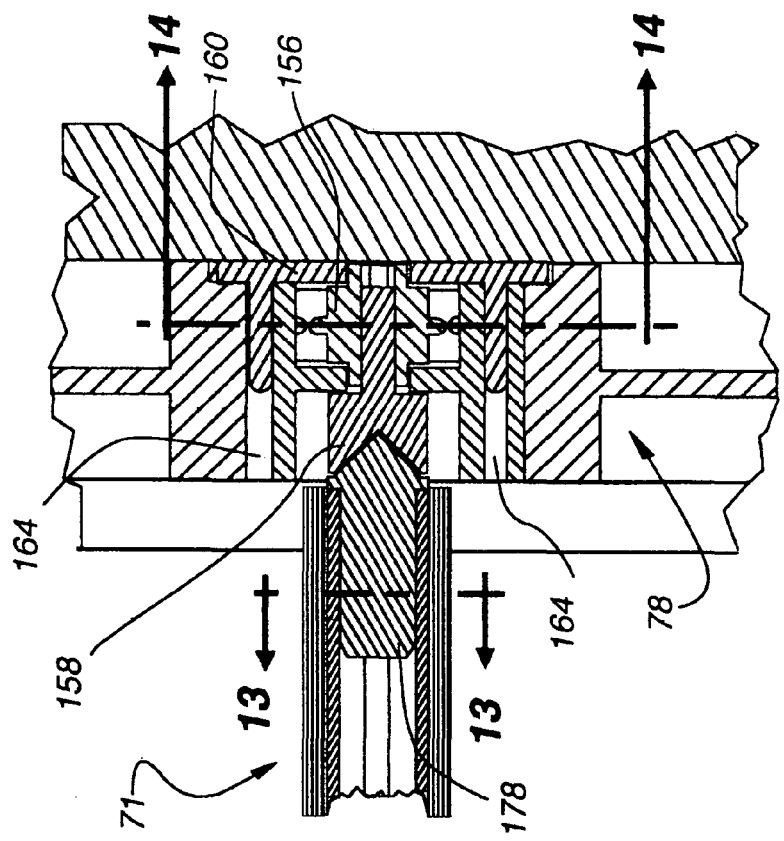
FIG. 9 is an enlarged fragmentary section taken along line 9—9 of FIG. 7.
Figure 10:
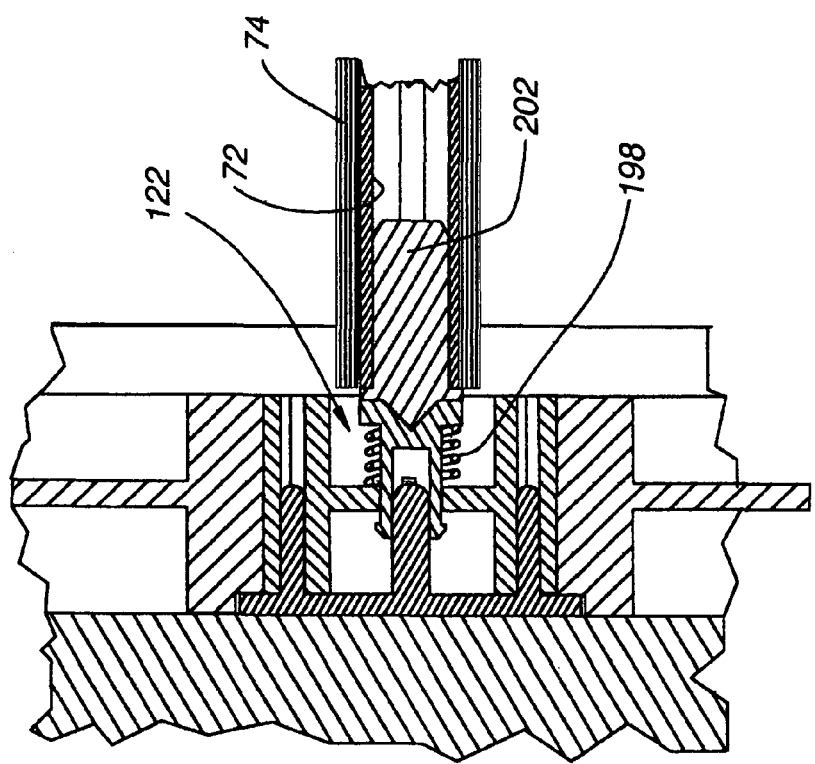
FIG. 10 is an enlarged fragmentary section taken along line 10—10 of FIG. 8.
Figure 11:
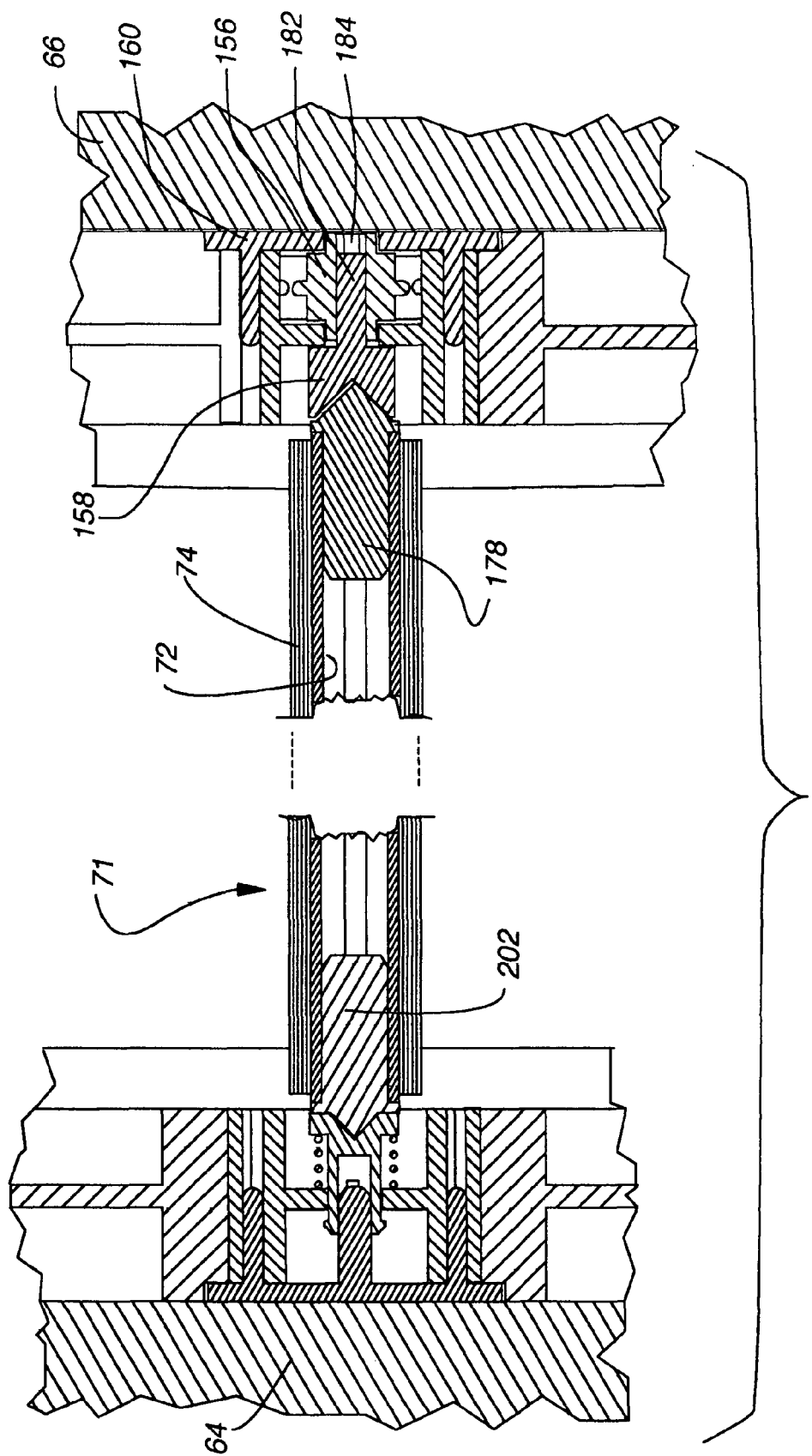
FIG. 11 is a fragmentary vertical section incorporating what is shown in FIGS. 9 and 10 and with the covering element mounted in the peripheral frame.
Figure 25:
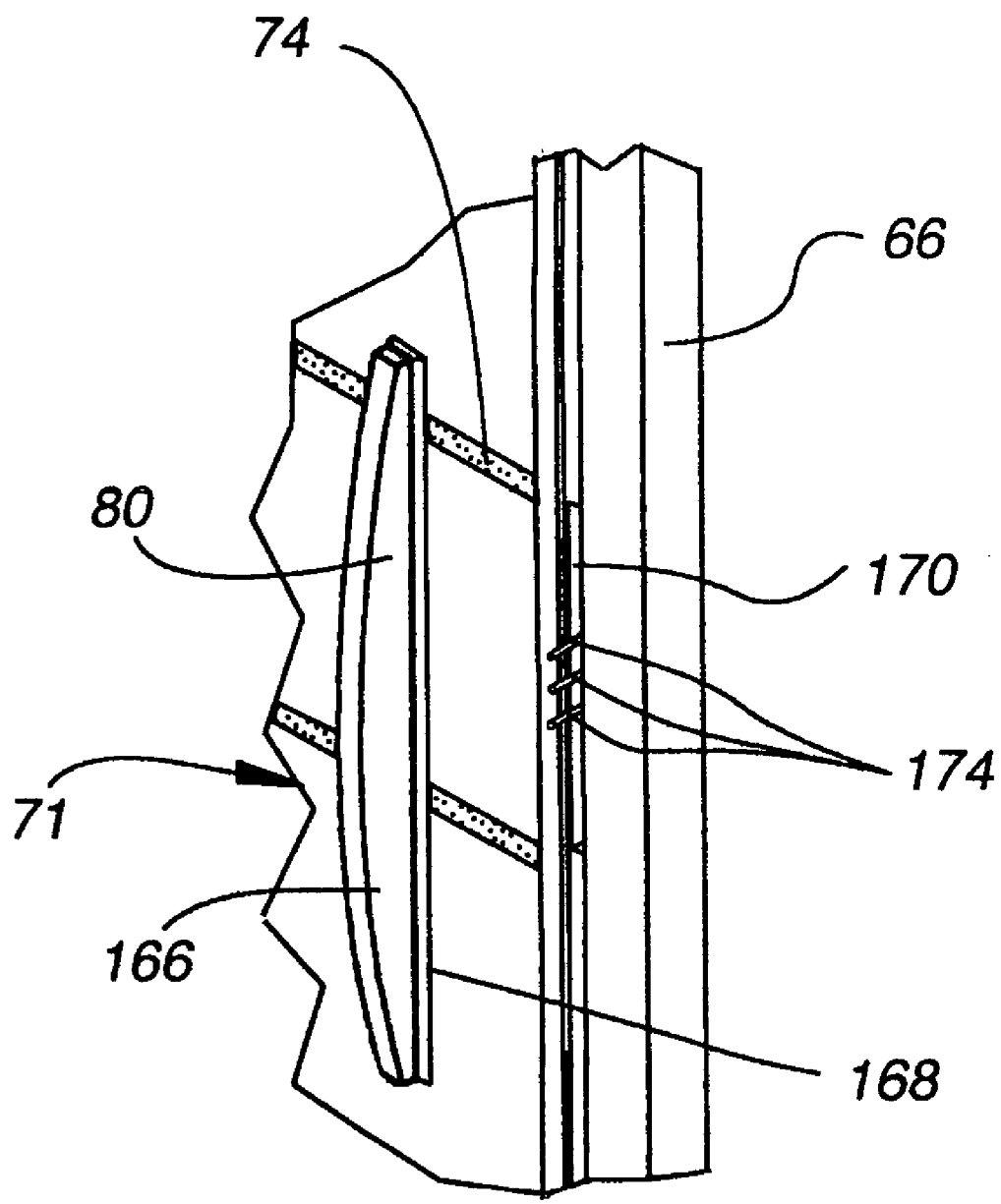
FIG. 25 is a fragmentary isometric showing the mounting of the finger slide for the covering of the present invention to other components of the drive system.
Figure 26:
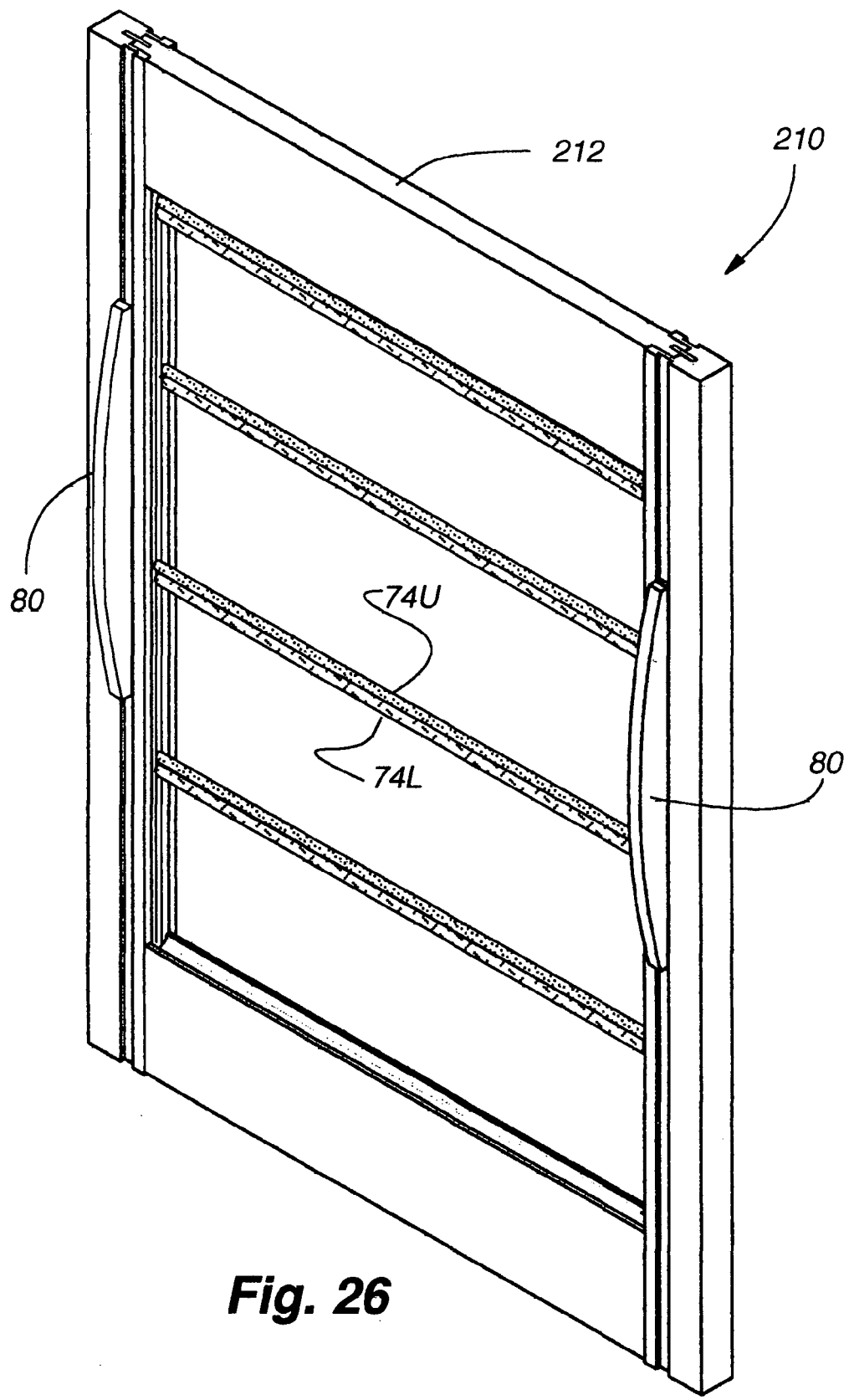
FIG. 26 is an isometric of a second embodiment of the present invention using pairs of covering elements at selected locations within the peripheral frame and wherein the covering is shown in a fully-retracted position.
Figure 27:
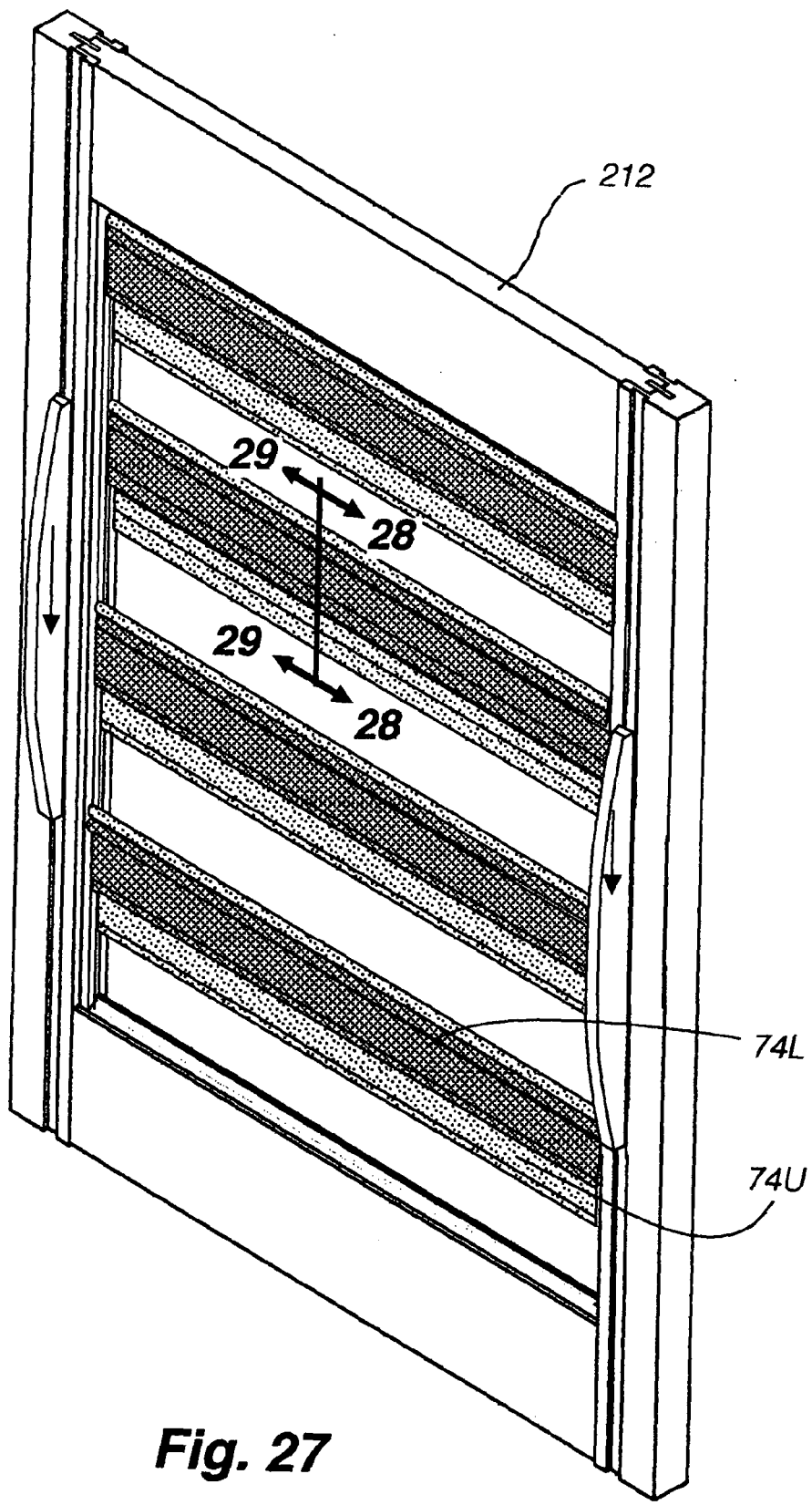
FIG. 27 is an isometric view of the embodiment shown in FIG. 26 with the covering in a partially extended position.
Figure 31:
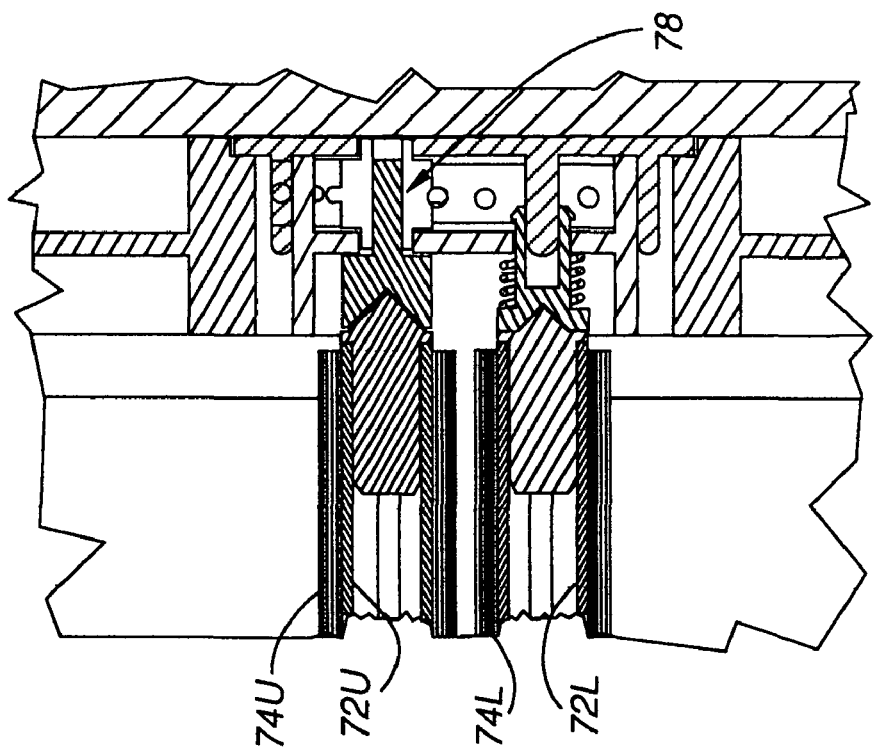
FIG. 31 is an enlarged fragmentary section taken along line 31—31 of FIG. 29.
Figure 30:
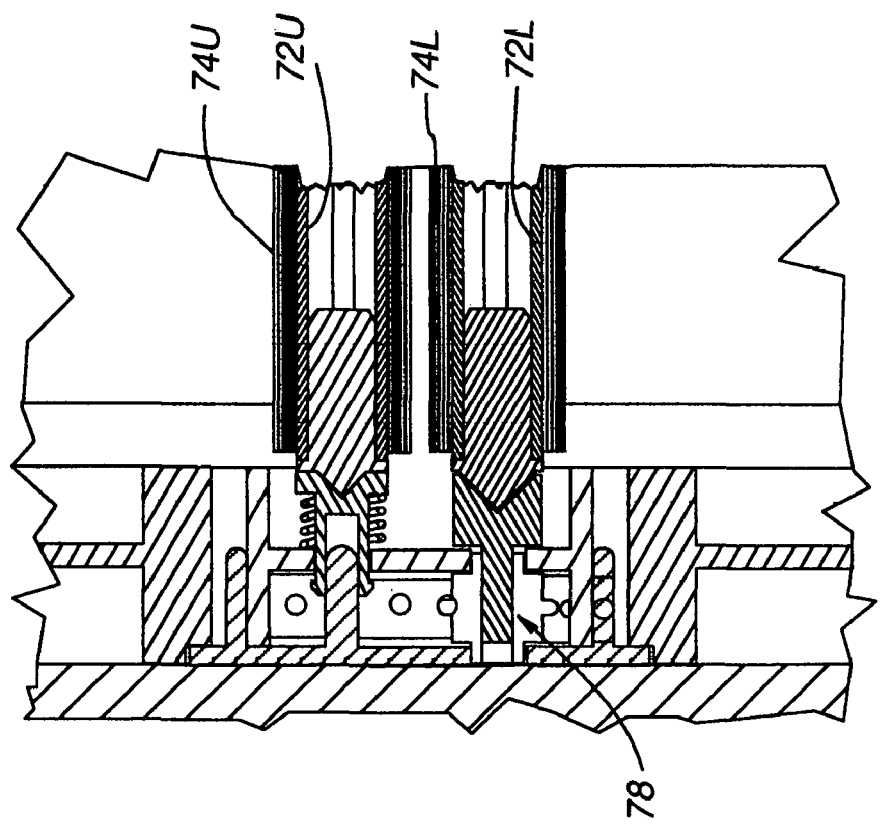
FIG. 30 is an enlarged fragmentary section taken along line 30—30 of FIG. 28.
Figure 32:
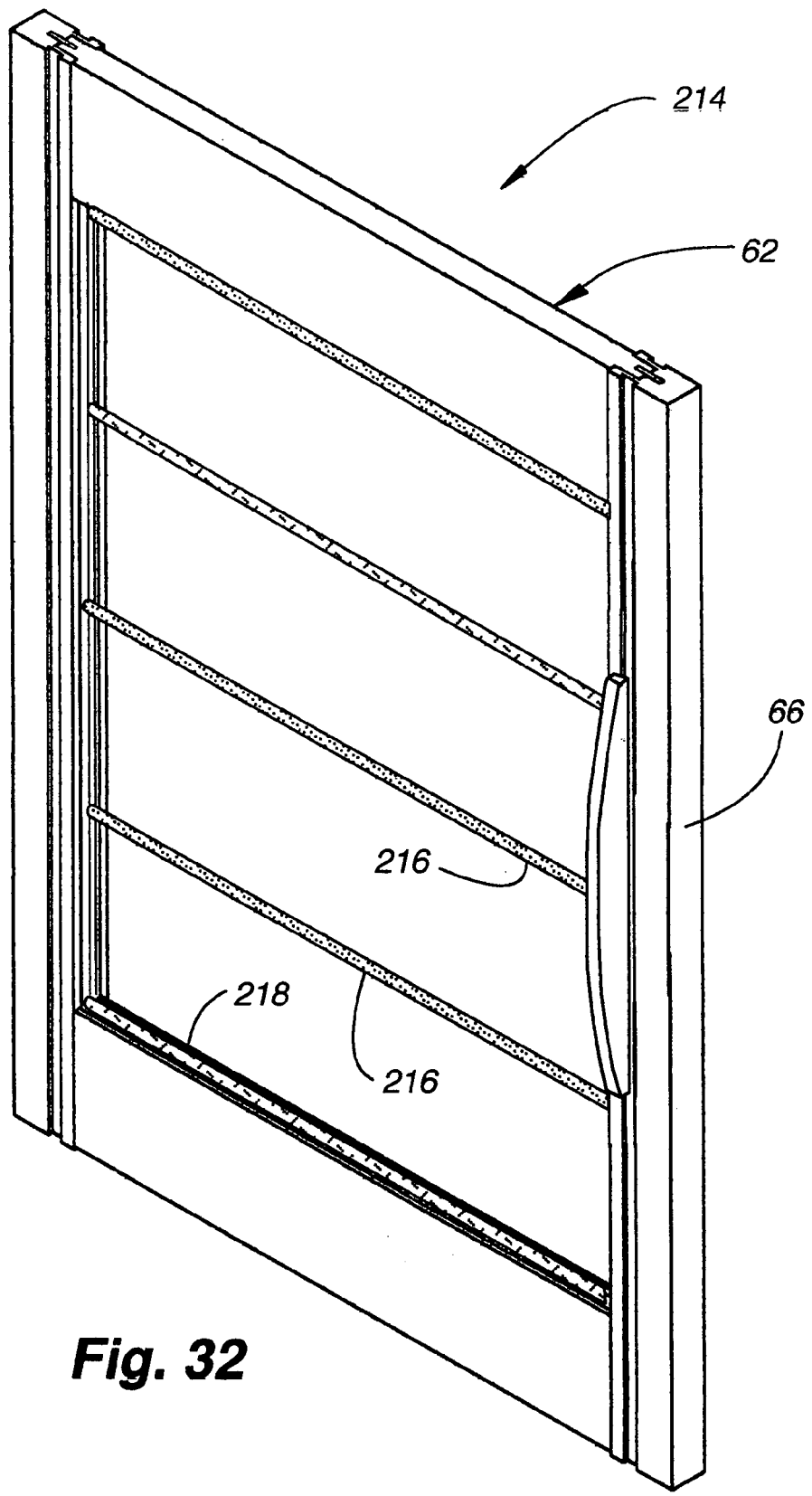
FIG. 32 is an isometric of a third embodiment of the covering of the present invention with the covering shown in a fully-retracted position.
Figure 33:
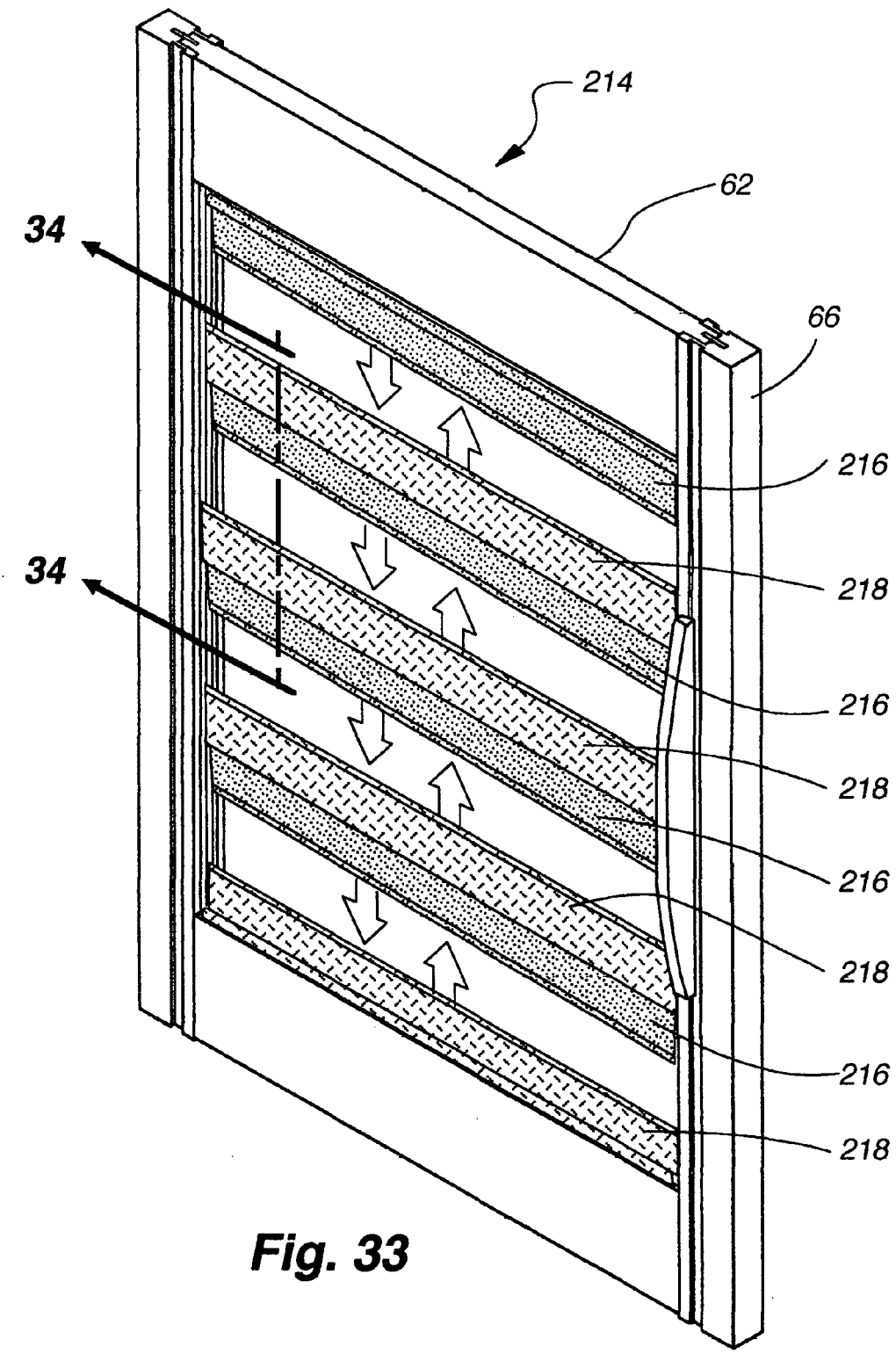
FIG. 33 is an isometric of the embodiment shown in FIG. 32 with the covering shown in a partially extended position.

The finger slide 80 shown in FIGS. 1 and 2 is possibly best seen from an operational standpoint in FIGS. 7 and 25. The finger slide is an elongated block of material having a forwardly protruding main body 166 which can be gripped by an operator of the system and a dove-tail projection 168 off the rear side which is adapted to slide within the groove 118 in the front of the side frame member 66 which is also dove-tailed in cross-section. The dove-tail groove in the side frame member has a vertical slot 170 (FIG. 7) cut therethrough which communicates with the main channel 82 of the side frame member so that a drive block 172 on the slide member can slidably protrude through the vertical slot 170. The drive block has three vertically spaced recesses therein which open through the rear face of the drive block and are adapted to receive three fingers 174 of a connector plate 176 also seen in FIG. 7. The three fingers in the connector plate are circular in cross-section and of a corresponding size to the holes 154 in the drive belt. Opposite ends of the drive belt 152 are overlapped at a location adjacent to the drive block 172 so that the fingers 174 on the connector plate can be inserted through aligned holes 154 at the ends of the drive belt and into the drive block to secure the ends of the drive belt to the drive block. It will therefore be appreciated that vertical sliding movement of the finger slide 80 within the dove-tail groove 118 will cause the timing belt to move in a corresponding direction and as will be explained hereafter, such movement causes the cog wheels to rotate in unison therewith. The drive belt extends around the cog wheels in the uppermost and lowermost modular connectors 122 and of course along the sides of the cog wheels associated with each modular connector therebetween. The drive belt is confined within the channels 150 of the guide members and the modular connectors so as to remain in positive engagement with the respective cog wheels.

As probably best seen in FIGS. 19 and 22, each roller 72 associated with a covering element 71 is hollow in construction having a longitudinal groove 176 along one side adapted to attach an edge of the flexible material 74 such as by a tongue in groove connection and has open ends, with the open end at the right end of the roller, adapted to receive a bevel gear 178. The bevel gear has a flat side 180 adapted to cooperate with a flat surface 181 in the interior of the roller so that the bevel gear rotates in unison with the roller. The bevel gear is adapted to matingly engage the miter gear 158 which has a hex shaft 182 receivable in a hex shaped axial passage 184 in the cog wheel so that the miter gear and cog wheel rotate in unison. It will therefore be appreciated that when the roller is operatively engaged with the miter gear, the roller will move or rotate in unison with the cog wheel in response to sliding movement of the finger slide. As will be explained hereafter, the roller 72 is disengageably connected to the miter gear so that the roller can be easily removed and exchanged.

The left side frame member 64 of the peripheral frame 62 has a plurality of guide members 120 and modular connectors 122 mounted therein identically to the right side frame member. Idler components are mounted in each modular connector in the left side frame member to rotatably support the left end of each roller 72. As seen in FIG. 22, a bearing plate 186 is mountable on each modular connector and includes a bearing shaft 188 adapted to protrude into the aperture 130 in the base of the modular connector and a pair of guide pins 190 that are received in the corresponding apertures 164 in the upper and lower blocks of the modular connector. As probably best appreciated in FIG. 10, the bearing shaft 188 of the bearing plate 186 supports an idler cylinder 192 that has a cylindrical recess 194 in one end for receiving the bearing shaft and a conical recess 196 (FIG. 12) in its opposite end. A compression spring 198 is disposed about a cylindrical body 200 of the idler cylinder such that the idler cylinder can be axially moved within the aperture 130 in the base of the modular connector and along the bearing shaft of the bearing plate. The open left end of each roller has a bearing pin 202 received therein that has a conical protrusion 204 from its outermost end with the conical protrusion being adapted to be rotatably seated in the conical recess 194. The spring mounting of the idler cylinder allows the rollers to be removed from the peripheral frame as possibly seen best in FIGS. 11 and 12.

Figure 12:
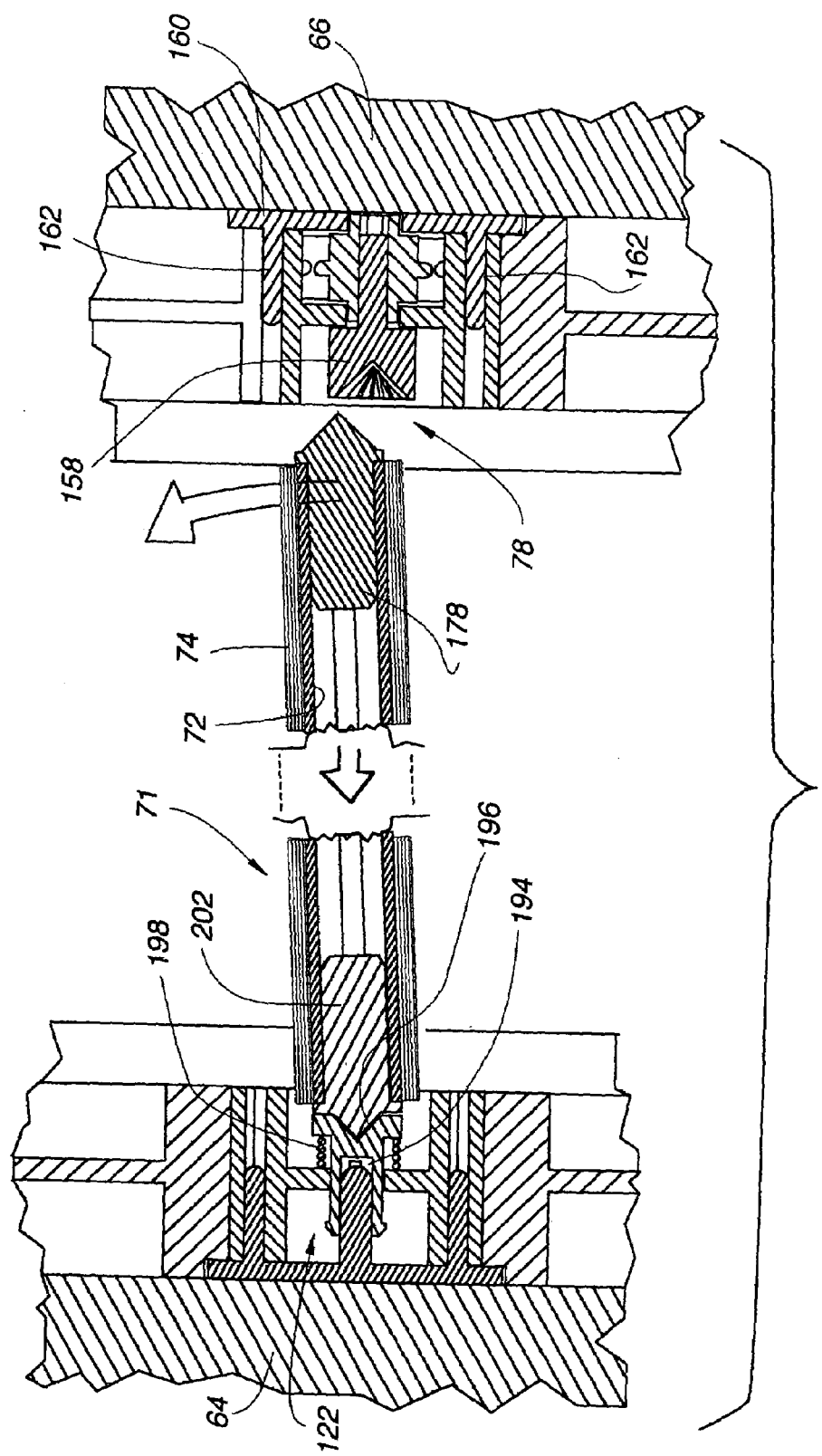
FIG. 12 is a section similar to FIG. 11 with the covering element being removed from the peripheral frame.

With reference to FIG. 12, it will be seen that a roller 72 can be slid axially to the left causing a compression of the compression spring 198 thereby freeing in a quick-release manner the right end of the miter from the engagement of the bevel 178 and miter 158 gears and so that the right end of the roller can be lifted or lowered thereby freeing the roller from the peripheral frame 62. Of course, to mount the roller in the frame, the opposite procedure is followed as by placing the left end of the roller into engagement with the idler cylinder and compressing the compression spring to allow the right end to be moved into alignment with the miter gear. Of course the compression spring retains the operative engagement of the bevel and miter gears during operation of the covering.

Figures 15, 16, 17, 18:
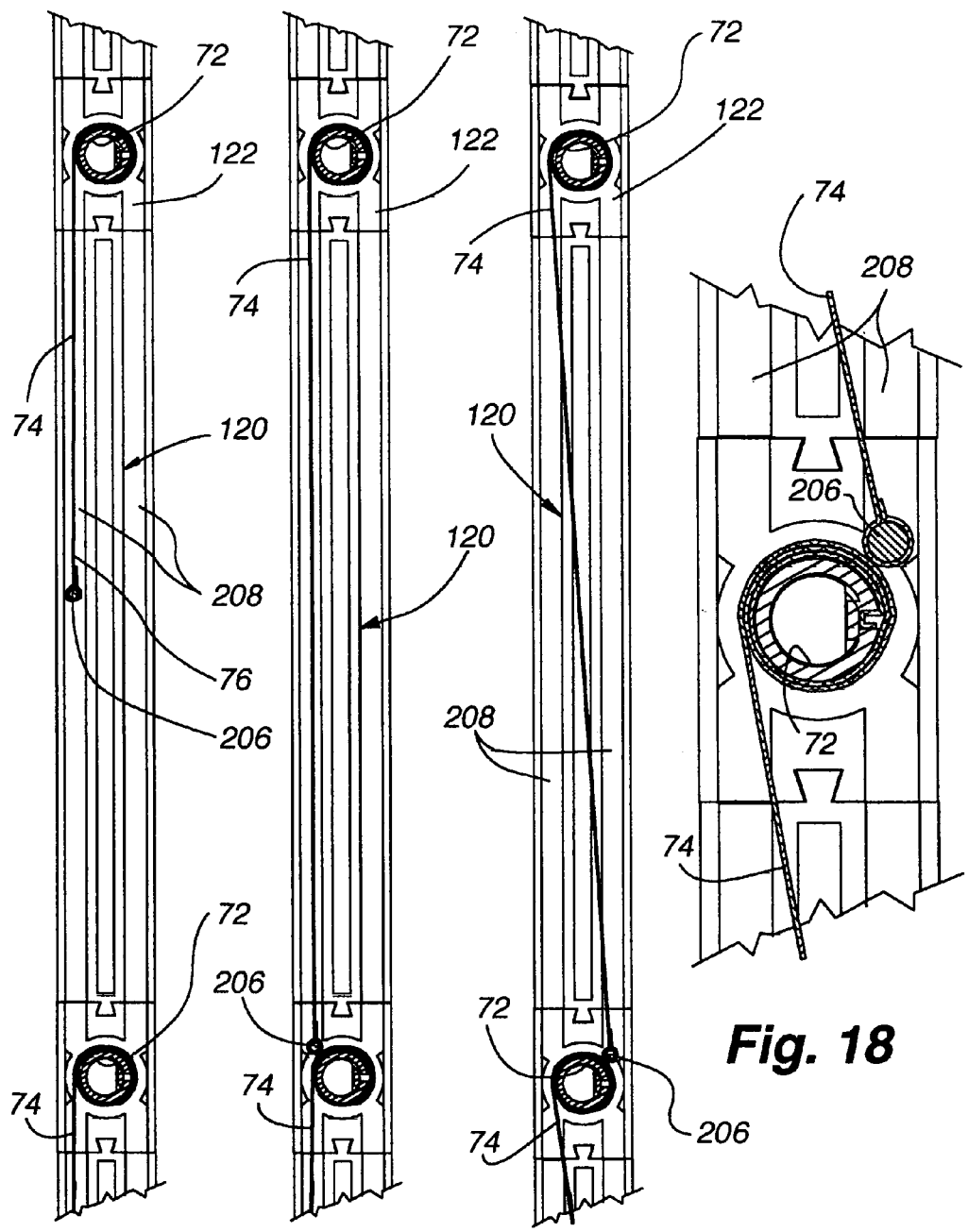
FIG. 15 is an enlarged fragmentary section taken along line 15—15 of FIG. 3.
FIG. 16 is a fragmentary section similar to FIG. 15 with the covering element in a fully-extended position.
FIG. 17 is a fragmentary section similar to FIG. 15 with the weighted bottom rail of a covering element disposed in a different channel of the peripheral frame.
FIG. 18 is an enlarged fragmentary section showing the weighted bottom rail of the covering element of FIG. 17 adjacent to the next lower roller.

With reference to FIGS. 3, 4 and 15 through 18, it will be appreciated that the lower or free edge 76 of each strip of flexible material 74 has a rod 206 secured in a hem thereof with the rod being weighted such that when the strip of flexible material is unrolled from its associated roller 72, the weight of the rod causes the material to extend or hang downwardly. The vertical movement of the weighted rod is guided within one of two channels 208 provided in the inwardly facing side of the guide members 120 as is probably best illustrated in FIGS. 15 through 18. In FIG. 15, it will be seen that the weighted rod is disposed in the channel adjacent the front edge of the guide member and in alignment with the front of the roller 72 off which the flexible material extends. FIG. 15 shows the weighted rod approximately midway between its extended and retracted positions while FIG. 16 shows the weighted rod fully extended and into a position adjacent to the next adjacent lower roller in the covering. It will therefore be seen that the flexible material can be moved into a position so as to totally affect the passage of vision or light when the covering is fully extended.

The weighted rod 206, as seen in FIGS. 17 and 18, is shown disposed and guided within the channel adjacent to the rear edge of the guide member 120 so that the flexible material 74 is slanted slightly toward the rear of the covering to give a different aesthetic appearance.

A second embodiment 210 of the covering of the present invention is shown in FIGS. 26 through 31. In this embodiment, as possibly best appreciated by reference to FIGS. 26 and 27, the outer peripheral frame 212 is identical to that previously described except that there is a drive mechanism 78 in the left side frame member as well as the right side frame member. In addition, the covering includes a pair of rollers 72 at each location where there was a single roller in the first described embodiment with each roller of a pair having a flexible material mounted thereon so as to be windable about the associated roller or unwound therefrom so as to depend from the roller similarly to the roller and material combinations previously described.

In this embodiment 210 of the covering of the present invention, the lower roller 72L of each pair of rollers is mounted identically to the first described embodiment but the upper roller 72U is mounted in its own modular connectors 122 which are stacked or mounted on top of a modular connector 122 associated with the lower roller of the pair. The direction or orientation of the upper roller 72U is reversed relative to the lower roller 72L of the pair so that the drive system for the upper roller is in the left side frame member with the idler end of the roller being in the right side frame member. As is apparent, a drive system 78 identical to that previously described for the right side frame member is mounted in the left side frame member so as to operatively drive the upper roller of each pair of rollers. The left end of a pair of rollers is shown in vertical section in FIG. 30 while the right end of the pair of rollers is shown in vertical section in FIG. 31.

With reference to FIGS. 28 and 29, it can be seen that the flexible material 74U mounted on the upper roller 72U of the pair is wound on the roller so as to depend and unroll from the back edge of the roller while the flexible material 74L on the lower roller 72L of the pair is mounted so as to depend from the front of the roller and to unroll from the front of the roller. To prevent the flexible materials from entangling, the weighted rod 206 associated with the flexible material on the upper roller is guided in the rearmost one of the channels 208 of a guide member 120 while the weighted rod associated with the lower roller is disposed and guided by the frontmost one of the channels 208 in the associated guide member.

The flexible materials associated with each roller could be of many different types including wovens and non-wovens, knit fabrics, shears, vinyls, etc. and can have varying characteristics with regard to aesthetics and utility. By way of example, one sheet of material might be an opaque material to function in blocking the passage of vision and light through the covering while the other material might be a shear or other decorative fabric whose principal role is aesthetics. As will also be appreciated, since each roller of a pair has an independent operating system, they can be simultaneously retracted or extended or one or the other can be extended while the other is retracted. Accordingly, various aesthetic and functional capabilities are available.

A third embodiment of the present invention is shown in FIGS. 32 through 38 wherein it will be appreciated that the peripheral frame 62 for the covering 214 is identical to that of the first described embodiment and the drive system 78 for the covering is identical and mounted in the right side frame member 66. In this embodiment of the invention, each roller 72 has a double wrap of flexible material thereon so that one sheet 216 of material drops downwardly when unrolled from the associated roller and the other sheet 218 of material extends or is pulled upwardly so that the two materials unwrap in opposite directions from the same roller. The materials wrapped on a roller can be identical or different and in most instances, the materials would have different functional and aesthetic characteristics. As will be appreciated from the following description, the sheets of material are simultaneously unwound from their associated roller through manipulation of the finger slide 80 as described in connection with the first embodiment of the present invention.

Figure 34:
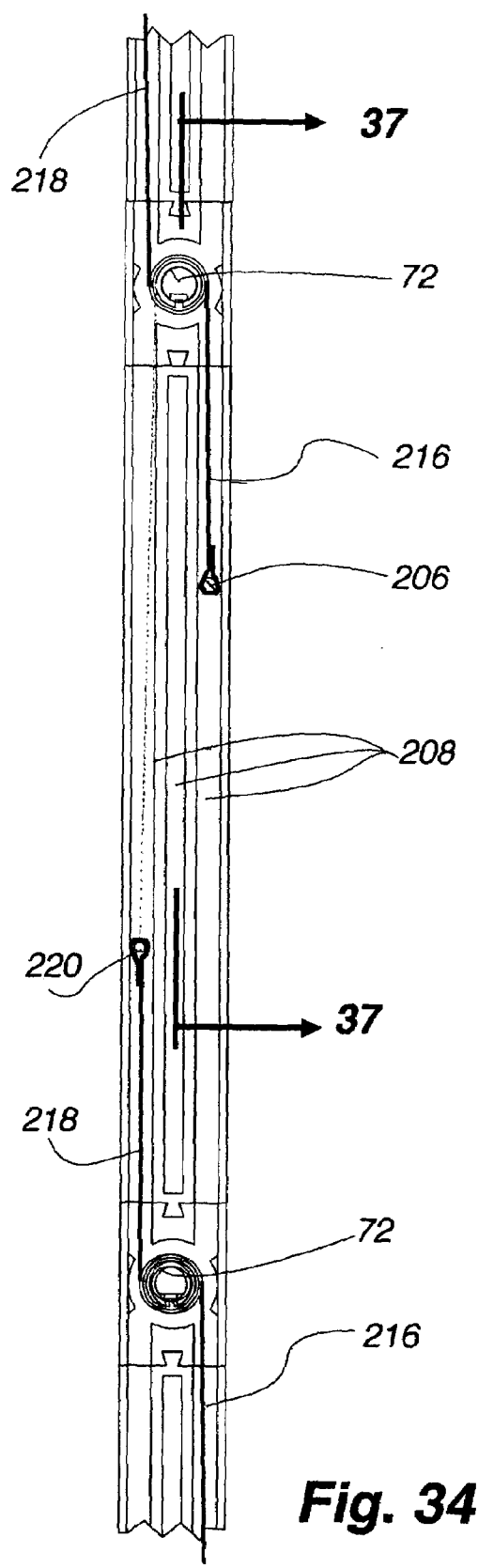
FIG. 34 is an enlarged fragmentary section taken along line 34—34 of FIG. 33.
Figure 36:
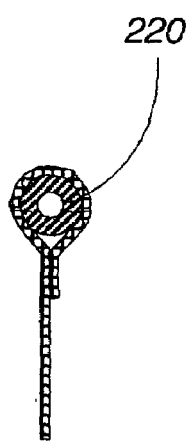
FIG. 36 is a fragmentary section similar to FIG. 35 showing the lead bar of the upwardly extending fabric material used in the covering of FIG. 32.

With the exception of the fact that the sheet of material 216 that extends downwardly from the roller is double wrapped on the roller 72 with the sheet of material 218 that extends upwardly, the operation of the downwardly extending sheet is identical to that of the first described embodiment. For the sheet of material 218 that extends upwardly from a roller, however, it has a lead bar 220 secured in a hem provided in the free edge 222 of the sheet of material and wherein the lead bar extends laterally from opposite sides of the sheet of material as best seen in FIGS. 34, 36 and 37. The lead bar is guided in the frontmost one of the channels 208 of the associated guide members 120 while the weighted bar 206 associated with the other sheet of material is guided in the rearmost one of the channels of the associated guide members. As seen in FIG. 37, the bevel gear 178 at the drive end of each roller and the bearing pin 202 at the idler end of each roller have been slightly modified to include an annular channel 224. The annular channel defines a pulley about which a lift cord 226 can extend. There is a lift cord anchored to each end of the lead bar 220 of the upwardly extending materials 218 and the cord passes around the pulley and is anchored at its opposite end to the weighted bar 206 of the material that depends downwardly from the next adjacent upper roller. The weighted bar is sufficient to not only pull the downwardly extending sheet of material from its associated roller but to also lift the upwardly extending sheet of material from the next adjacent lower roller when the rollers are rotated by the drive system.

Figure 35:
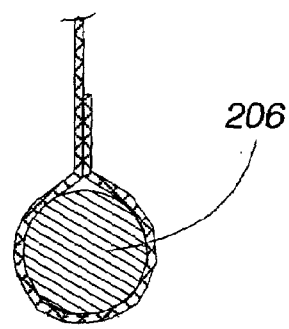
FIG. 35 is a section taken through the weighted bottom rail of the depending fabric used in the covering of FIG. 32.

As can be appreciated from FIGS. 35 and 36, the weighted bar 206 shown in FIG. 35 is considerably larger and is designed to be sufficiently heavy to lift the relatively small lead bar 220 shown in FIG. 36 and the material associated therewith.

Accordingly, when the finger slide 80 is moved to unwrap the double-wrapped sheets of materials from an associated roller, the weighted bar on the depending sheet of material pulls that sheet downwardly and simultaneously lifts the lead bar associated with the next adjacent lower roller so that both sheets of material are moved and unwrapped in unison. Of course, the sheets of material can be unwound from their associated rollers to any desired degree between fully extended and fully retracted.

As will be appreciated due to the diversity of materials that can be used for the upwardly extending and downwardly extending sheets of material, numerous variations in both aesthetics and functionality are possible.

Figure 46:
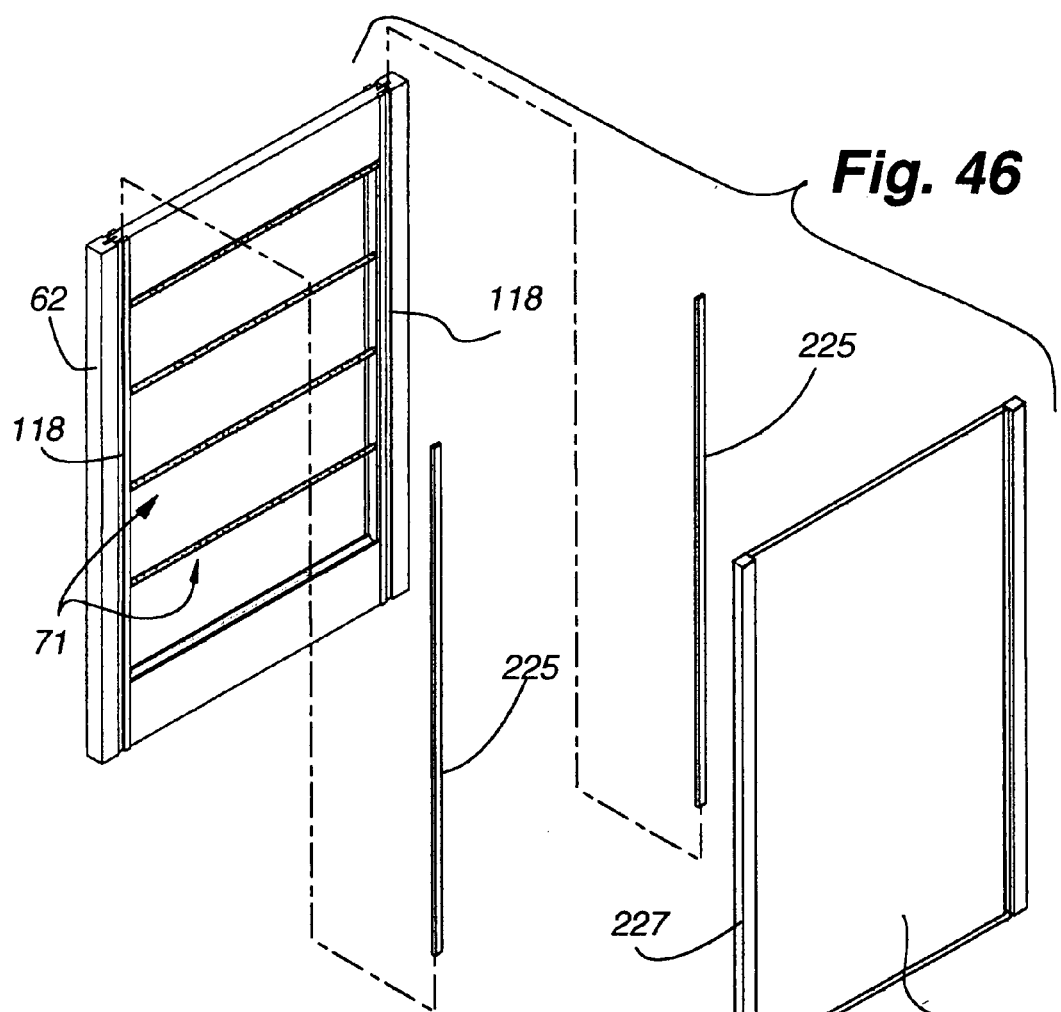
FIG. 46 is an exploded isometric showing components of the embodiment of the invention shown in FIG. 39.
Figure 47:
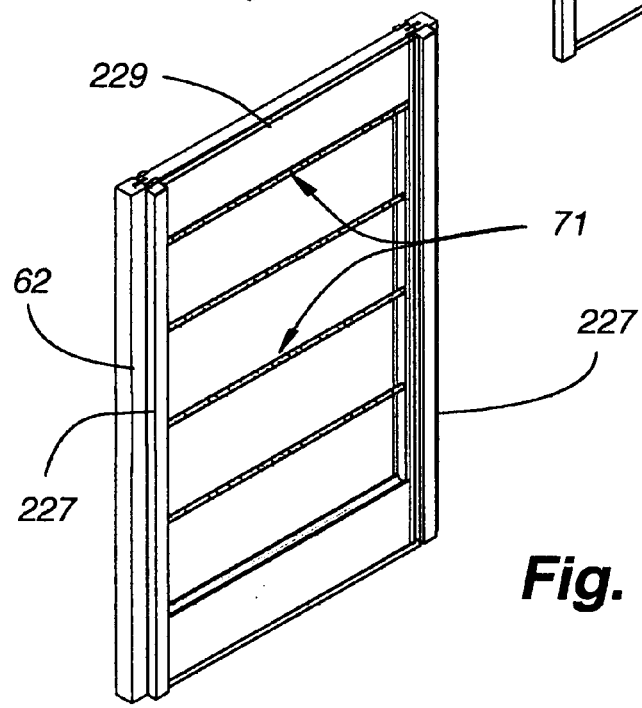
FIG. 47 is an isometric of an assembled peripheral frame with corresponding covering elements of the embodiment shown in FIG. 39.
Figure 56:
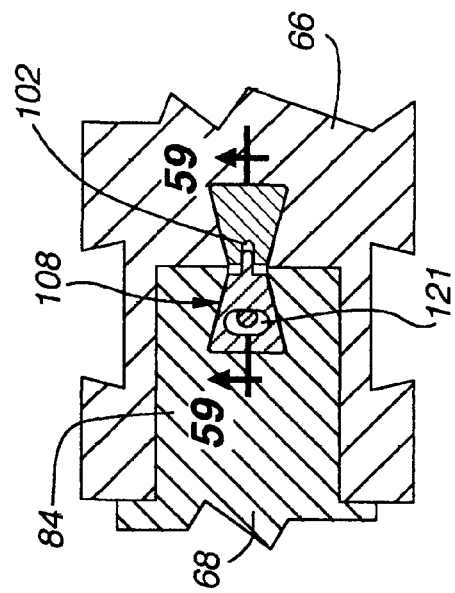
FIG. 56 is an enlarged section taken long line 56—56 of FIG. 51.
Figure 57:
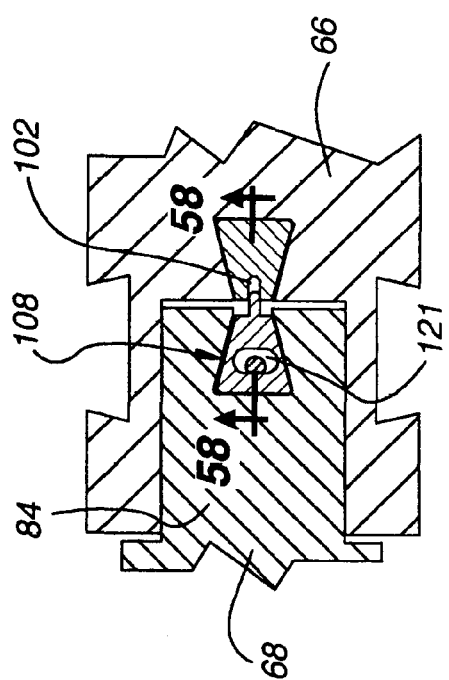
FIG. 57 is a section similar to FIG. 56 with a movable part of the dove-tail connector having been shifted toward the fixed part of the connector.
Figure 58:
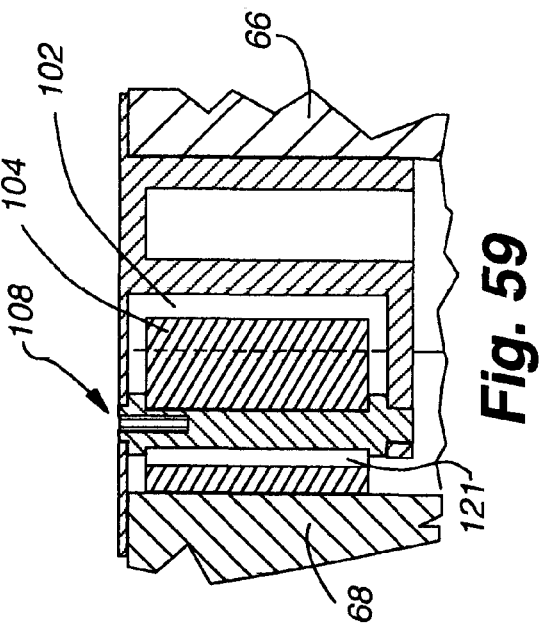
FIG. 58 is an enlarged section taken long line 58—58 of FIG. 56.
Figure 59:
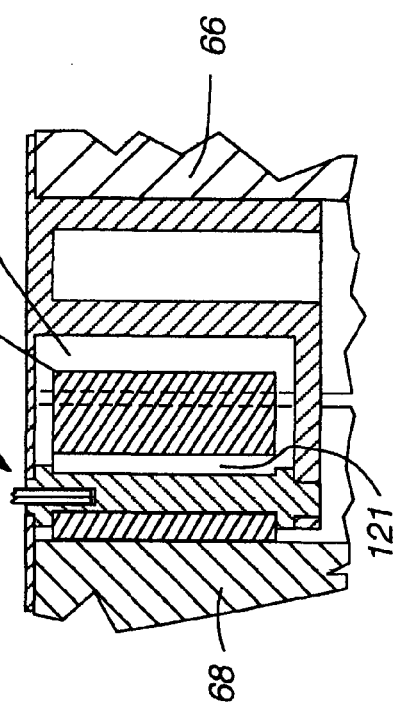
FIG. 59 is an enlarged section taken long line 59—59 of FIG. 57.

With reference to FIG. 46, it will be recalled that the side frame members 64 and 66 of the peripheral frame have a dove-tail groove or channel 118 provided in both the front and rear surface thereof with the groove in the front surface used to mount and guide the finger slide 80. In any of the previously described embodiments of the invention, decorative strips 225 having a dove-tail configuration can be inserted into the dove-tail groove 118 on the opposite side of the frame from the finger slide. The strip could be of identical material to that of which the peripheral frame is made or could be made of a different material for either aesthetic or functional reasons. For example, the strip could be a magnetic strip to cooperate with the metal frame 227 of a screen 229 to hold the screen adjacent to the peripheral frame 62.

Figure 39:
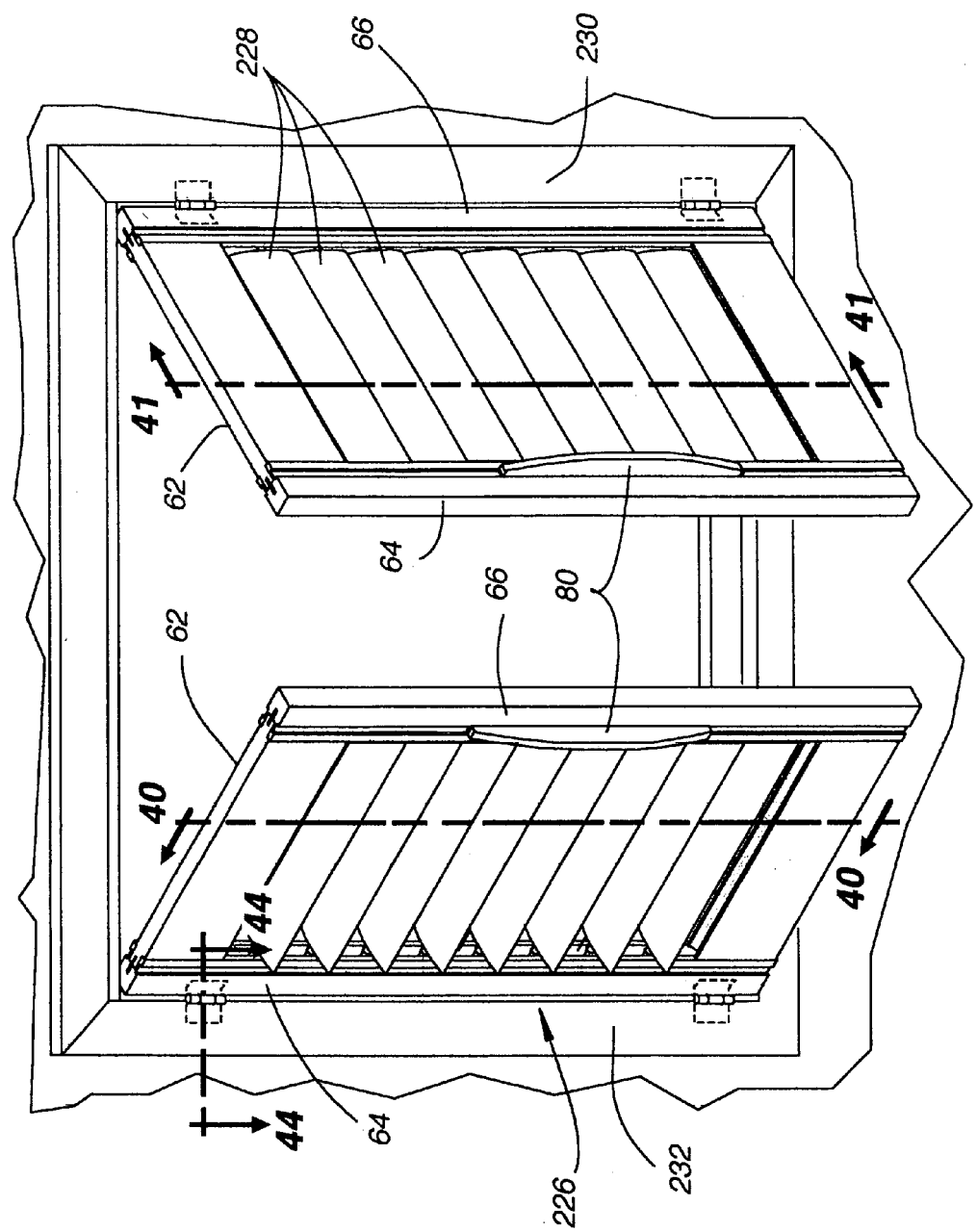
FIG. 39 is an front isometric showing a fourth embodiment of the covering of the present invention.
Figure 40:
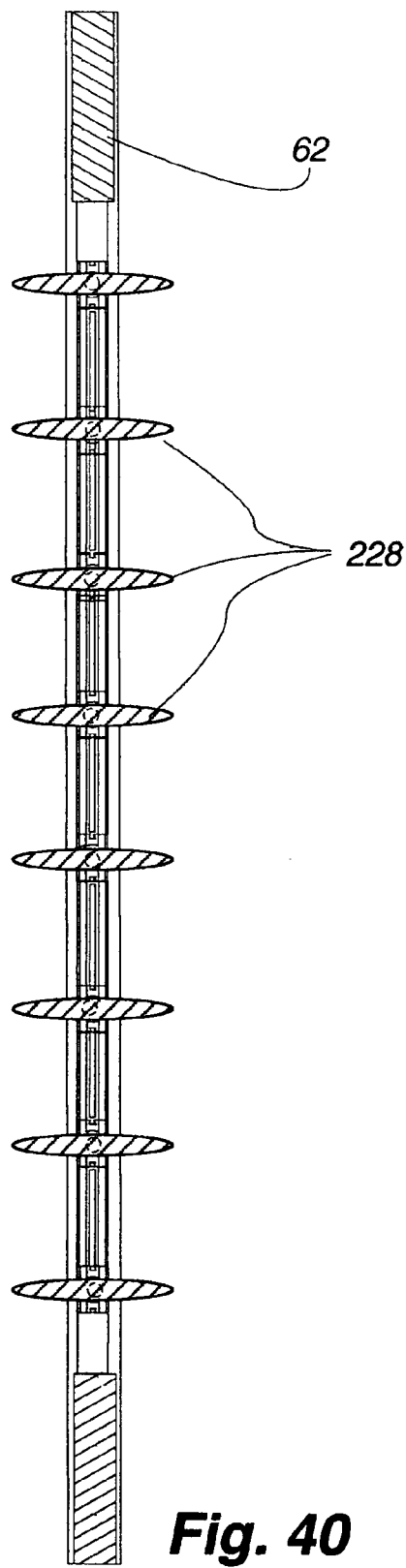
FIG. 40 is an enlarged section taken along line 40—40 of FIG. 39.
Figure 41:
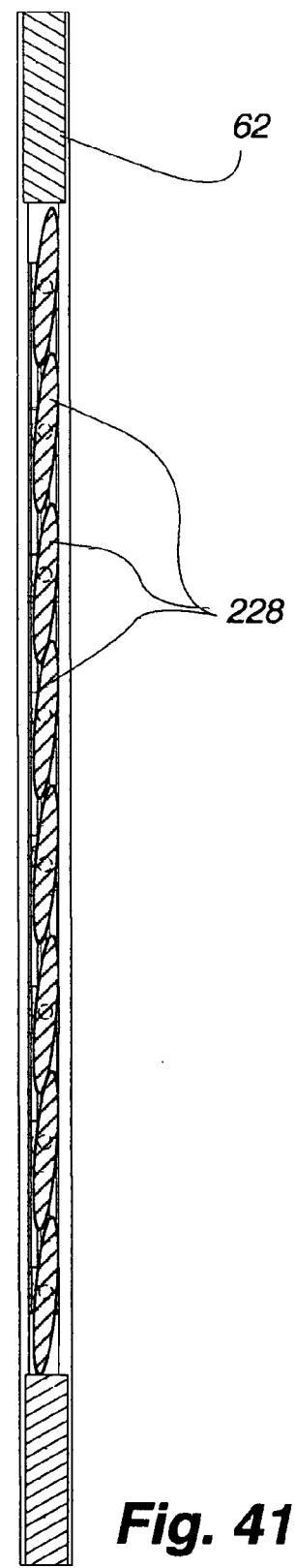
FIG. 41 is an enlarged section taken along line 41—41 of FIG. 39.
Figure 42:
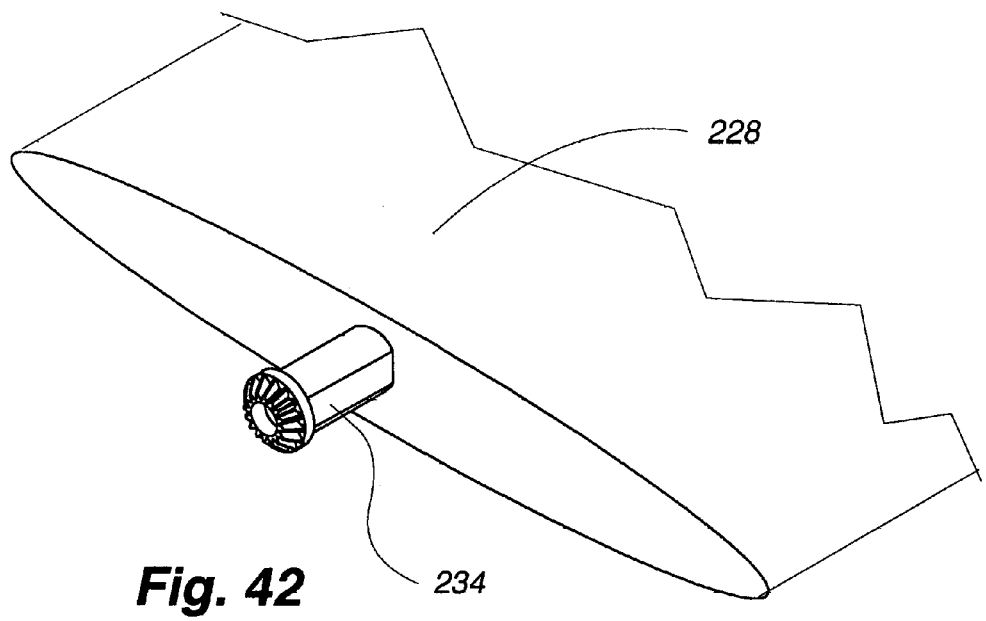
FIG. 42 is a fragmentary isometric showing the drive end of a slat of the covering shown in FIG. 39.
Figure 43:
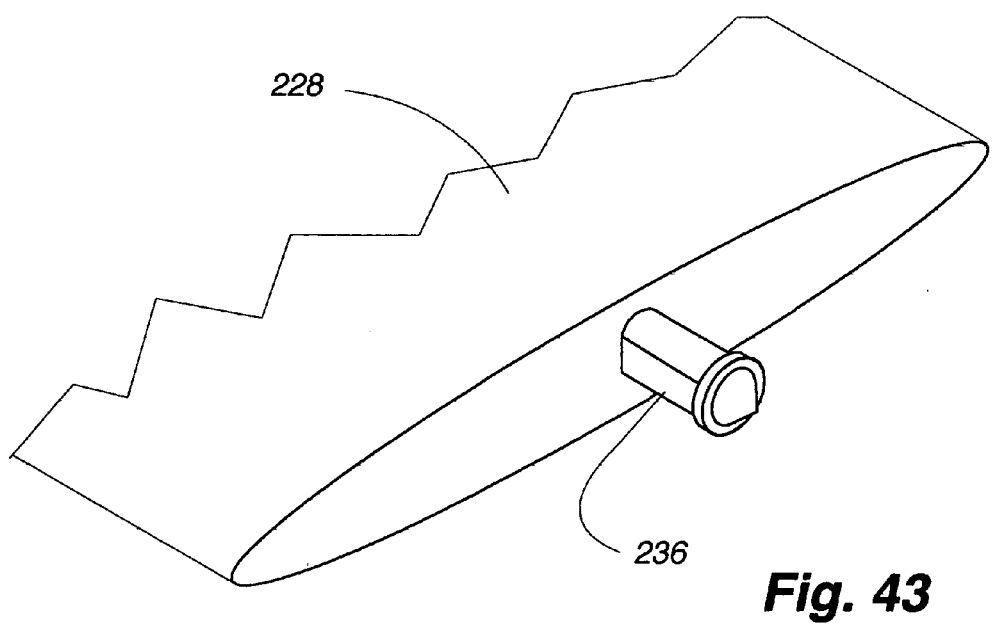
FIG. 43 is a fragmentary isometric showing the idler end of a slat used in the covering of FIG. 39.

A fourth embodiment of the present invention is shown in FIGS. 39 through 46 and as will be appreciated by particular reference to FIG. 39, the covering 226 utilizes a peripheral frame 62 and a drive system (not seen) mounted in one of the left 64 or right 66 side frame members. The covering has the general appearance of a conventional shutter, except that the system for opening and closing slats 228 is different from a conventional shutter. As will be appreciated by reference to FIG. 39, there are two peripheral frames 62 utilized with one frame being hingedly connected to the right side 230 of an architectural opening frame and the other peripheral frame being hingedly connected to the left side 232 of the architectural opening frame. The peripheral frame on the right has its drive system mounted in the left side frame member while the peripheral frame on the left has its drive system mounted in the right side frame member. Each drive system is identical to that described in connection with the first embodiment with a principal distinction between this embodiment of the present invention and the previously described embodiments residing in the fact that in this embodiment, the rollers on which the flexible materials were mounted in the previously described embodiments are in the form the rigid slats 228. The slats of course could be wooden, plastic, or any other suitable material.

Each wooden slat 228 can be seen to define an elongated body having projecting from its central longitudinal axis at one end a bevel gear 234 similar in configuration to the bevel gear described previously in connection with the prior embodiments. The opposite end of each slat has extending from its central longitudinal axis an idler pin 236 similar to that previously described in connection with the prior embodiments. The wooden slat is mounted in the peripheral frame identically to the previously described rollers 72 of the prior embodiments and the slats are thereby pivotable about their central longitudinal axis by movement of the finger slides 80. The finger slides which operate the drive mechanisms cause the slats to pivot about their horizontal, central longitudinal axis so that they are movable between an open horizontal position illustrated on the left peripheral frame in FIG. 39 and further shown in FIG. 40 and a closed vertical position shown on the right peripheral frame and further shown in FIG. 41.

Figure 44:
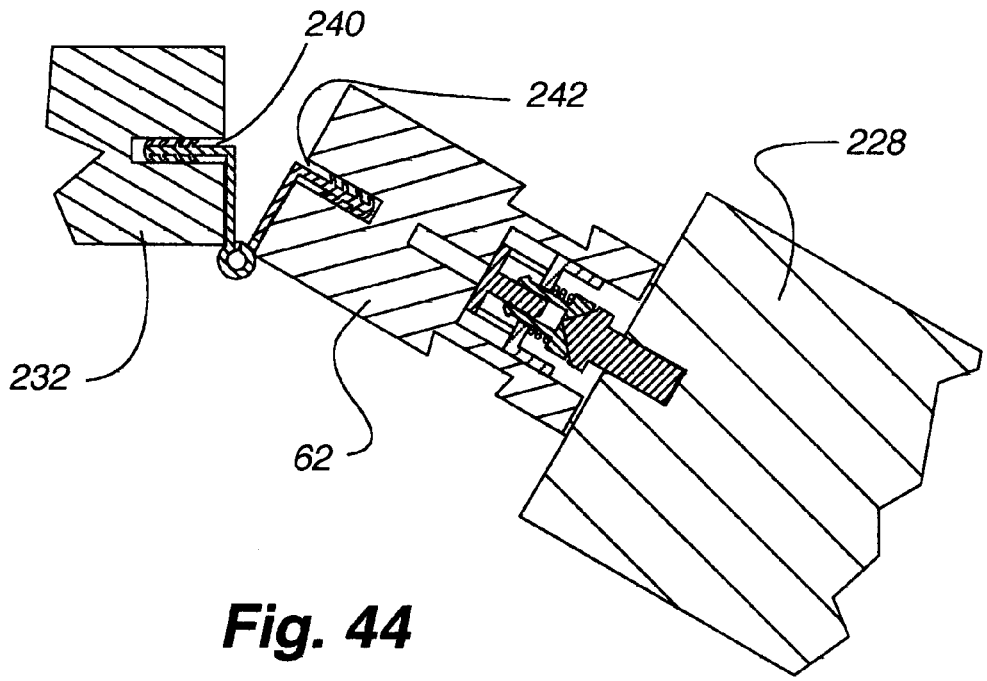
FIG. 44 is an enlarged fragmentary section taken along line 44—44 of FIG. 39.
Figure 45:
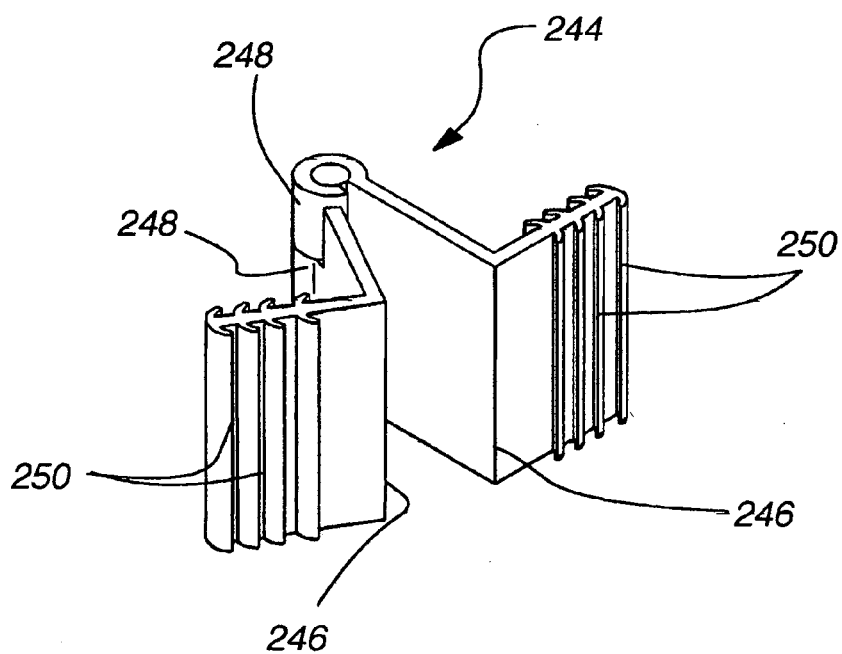
FIG. 45 is an isometric of a hinge utilized to connect the peripheral frame of FIG. 39 to the outer frame of the architectural opening.

In order to pivotally mount the peripheral frames 62 in the architectural opening frame, a vertical groove 240 as shown in FIG. 44, can be formed in the vertical side of the architectural frame and an identical groove 242 can be provided in the outer edge of the adjacent peripheral side frame member. A hinge 244 of the type shown in FIG. 45 can be used to interconnect the main frame with the peripheral frame through use of the grooves. The hinge 244 could be of the living hinge type but as illustrated the hinge has two identical but inverted component parts 246 that are pivotally connected like a door hinge so that cylindrical bodies 248 along one edge of each hinge member can be vertically stacked and aligned to receive a pivot pin (not shown). Each half of the hinge is therefore free to swing and pivot about the pivot pin relative to the other half. Each half of the hinge has an L-shaped configuration with the outermost leg having a plurality of barbed spurs 250 or the like. The hinge is preferably made of a somewhat flexible material so that the barbed spurs can be inserted into the grooves 240 and 242 in the side of the frame and the associated side frame member of the peripheral frame as shown in FIG. 44. The spurs, of course, are tapered as illustrated in FIG. 45 so that they can be inserted into the associated grooves but not easily removed therefrom.

It will be appreciated from the above that a covering for an architectural opening has been described which is versatile and is modular in construction so that the rollers for example in the first described embodiments can be easily replaced with rollers having materials of different aesthetics or functional characteristics while the slats in the last described embodiment can be easily replaced with slats of a different color, texture or the like. Further, the modular drive system can accommodate architectural openings of any size.

Although the present invention has been described with a certain degree of particularity, it is understood that the present disclosure has been made by way of example, and changes in detail or structure may be made without departing from the spirit of the invention as defined in the appended claims.

The invention claimed is:

1. A modular covering comprising in combination: a peripheral frame surrounding at least a portion of an opening defined by said frame, a plurality of rollers extending between and being secured to opposite sides of said frame at predetermined locations, each of said rollers including at least one sheet of material adapted to be selectively rolled around or unrolled from said roller and when unrolled from said roller being adapted to extend across at least a portion of said opening, and a drive system in said frame for selectively, simultaneously and reversibly rotating each of said rollers and wherein each of said rollers is releasably connected to said drive system by means of a spring-biased shaft coupling having complimentary mating formations to transmit motion when connected.

2. The covering of claim 1, where at least some locations of said rollers have a pair of such rollers.

3. The covering of claim 2 wherein the material on each roller of said pair is adapted to extend in the same direction within a common plane when unrolled from said roller.

4. A modular covering comprising in combination: a peripheral frame surrounding at least a portion of an opening defined by said frame, a plurality of rollers extending between and being secured to opposite sides of said frame and being releasably connected to said frame, each of said rollers having a covering element that is movable with the roller between open and closed positions, a drive system in said frame for selectively, simultaneously and reversibly rotating said rollers and wherein each of said rollers is releasably connected to said drive system by means of a spring-biased shaft coupling having complimentary mating formations to transmit motion when connected.

5. The covering of claim 4 wherein each of said covering elements is a flexible material.

6. The covering of claim 1 or 4 wherein said drive system includes modular components positioned in said frame which are releasably interconnectable.

7. A modular covering comprising in combination:
a peripheral frame surrounding at least a portion of an opening defined by said frame,
at least one roller extending between opposite sides of said frame, said roller including at least one sheet of material adapted to be selectively rolled around or unrolled from said roller and when unrolled from said roller being adapted to extend across at least a portion of said opening, and a drive system in said frame for selectively and reversibly rotating said rollers and wherein said roller is releasably connected to said drive system,
wherein said peripheral frame includes a system for interconnecting a pair of side-by-side pieces of frame material extending along a reference line, said system comprising in combination, a recess bridging said reference line so as to extend into each of said side-by-side pieces of frame material, said recess having definable portions each of non-circular cross section, in each of said pieces of frame material, and an adjustable connector insertable into said recess, said adjustable connector including a fixed component for receipt in said definable portion of one of said pieces of frame material and a movable component, connected to said fixed component with a cap, for receipt in said definable portion of the other of said pieces of frame material, said fixed and movable components substantially conforming in cross-sectional configuration to said recess portions, said movable component being mounted for movement relatively to said fixed component and a drive system for selectively moving said movable component relative to said fixed component such that when said movable component is moved relative to said fixed component in a predetermined direction said pieces of frame material are drawn toward each other.

8. A modular covering for architectural openings comprising in combination:
a peripheral frame surrounding at least a portion of said opening, at least one roller extending between and being secured to opposite sides of said frame, said roller including two sheets of material wrapped around said roller such that said sheets extend in opposite directions from said roller when unrolled therefrom, said sheets when unrolled from said roller being adapted to extend across at least a portion of said opening, and a drive system in said frame for selectively and reversibly rotating said roller and wherein said roller is releasably connected to said drive system.

9. A modular covering comprising in combination:
a peripheral frame surrounding at least a portion of an opening defined by said frame, a plurality rollers extending between and being secured to opposite sides of said frame, said rollers being rotatable but fixed in spacial position, said roller including at least one sheet of material adapted to be selectively rolled around or unrolled from said rollers and when unrolled from said rollers being adapted to extend across at least a portion of said opening, and a drive system in said frame for selectively and reversibly rotating said rollers simutaneously in the same direction, said drive system including a slide member mounted on said peripheral frame, and wherein said rollers are releasably connected to said drive system.

10. A modular covering comprising in combination:
a peripheral frame surrounding at least a portion of an opening defined by said frame, at least one roller extending between and being secured to opposite sides of said frame and being releasably connected to said frame, said roller having a covering element that is movable with the roller between open and closed positions, a drive system in said frame for selectively and reversibly rotating said roller, said drive system including a slide member mounted on said peripheral frame, and wherein said roller is releasably connected to said drive system.

11. A modular covering comprising in combination:
a peripheral frame surrounding at least a portion of an opening defined by said frame, at least one roller extending between and being secured to opposite sides of said frame, said roller including at least one sheet of material adapted to be selectively rolled around or unrolled from said roller and when unrolled from said roller being adapted to extend across at least a portion of said opening, and a drive system in said frame for selectively and reversibly rotating said roller, said drive system including a slide member mounted on said peripheral frame, and wherein said drive system further includes modular components positioned in said frame which are releasably interconnectable, and wherein said roller is releasably connected to said drive system.

12. A modular covering comprising in combination:
a peripheral frame surrounding at least a portion of an opening defined by said frame, at least one roller extending between and being secured to opposite sides of said frame and being releasably connected to said frame, said roller having a covering element that is movable with the roller between open and closed positions, a drive system in said frame for selectively and reversibly rotating said roller, said drive system including a slide member mounted on said peripheral frame, and wherein said drive system further includes modular components positioned in said frame which are releasably interconnectable, and wherein said roller is releasably connected to said drive system.

13. A modular covering for architectural openings comprising in combination:
a peripheral frame surrounding at least a portion of said opening,
at least one roller extending between opposite sides of said frame, said roller including at least one sheet of material adapted to be selectively rolled around or unrolled from said roller and when unrolled from said roller being adapted to extend across at least a portion of said opening,
a drive system in said frame for selectively and reversibly rotating said roller and wherein said roller is releasably connected to said drive system,
wherein said peripheral frame includes a system for interconnecting a pair of side-by-side pieces of material extending along a reference line, said system comprising in combination, a recess bridging said reference line so as to extend into each of said side-by-side pieces of material, said recess having definable portions in each of said pieces of material, and an adjustable connector insertable into said recess, said adjustable connector including a fixed component for receipt in said definable portion of one of said pieces of material and a movable component for receipt in said definable portion of the other of said pieces of material, said movable component being mounted for movement relatively to said fixed component and a drive system for selectively moving said movable component relative to said fixed component such that when said movable component is moved relative to said fixed component in a predetermined direction said pieces of material are drawn toward each other, and
wherein said fixed and movable components in cross-section are configured in combination to substantially fill said recess in cross-section.

14. The covering of claim 13 wherein said definable portions of said recess are each of dove-tail configuration and said fixed and movable components are each of dove-tail configuration.

15. The covering of claim 14 wherein one or the other of said fixed and movable components is slightly smaller than said definable portion in which it is inserted.

16. The covering of claim 15 wherein said drive system includes a rotatable eccentric shaft extending through one of said fixed and movable component, such that upon rotation of said eccentric shaft about an eccentric axis, said components are relatively movable toward and way from each other.

17. The covering of claim 16 wherein said eccentric shaft is mounted within a non-circular opening through said movable component.

* * * * *